United States Patent
Higuchi et al.

(10) Patent No.: US 8,035,041 B2
(45) Date of Patent: Oct. 11, 2011

(54) COMBINATIONAL MACHINE THAT PERFORMS A FIRST COMBINATIONAL CALCULATION AMONG EACH OF A PLURALITY OF BASE GROUPS, DISCHARGES THEM INTO RESPECTIVE DISCHARGE CHUTES, AND THEN PERFORMS A SECOND COMBINATIONAL CALCULATION AMONG THE DISCHARGED GROUPS

(75) Inventors: Hiroshi Higuchi, Takasago (JP); Shozo Kawanishi, Nishinomiya (JP); Taketoshi Okamura, Ashiya (JP)

(73) Assignee: Shozo Kawanishi, Nishinomiya-shi (JP)

( * ) Notice: Subject to any disclaimer, the term of this patent is extended or adjusted under 35 U.S.C. 154(b) by 601 days.

(21) Appl. No.: 11/719,725

(22) PCT Filed: Nov. 8, 2005

(86) PCT No.: PCT/JP2005/020411
§ 371 (c)(1),
(2), (4) Date: Nov. 18, 2008

(87) PCT Pub. No.: WO2006/054455
PCT Pub. Date: May 26, 2006

(65) Prior Publication Data
US 2009/0152019 A1    Jun. 18, 2009

(30) Foreign Application Priority Data
Nov. 18, 2004  (JP) .................................. 2004-333883

(51) Int. Cl.
*G01G 19/387* (2006.01)
(52) U.S. Cl. .................................................. 177/25.18
(58) Field of Classification Search ............... 177/25.18
See application file for complete search history.

(56) References Cited

U.S. PATENT DOCUMENTS
4,399,880 A    8/1983   Konishi
(Continued)

FOREIGN PATENT DOCUMENTS
EP    0 060 633 A2    9/1982
(Continued)

OTHER PUBLICATIONS
International Search Report for PCT/JP2005/020411, dated Nov. 29, 2005.
(Continued)

*Primary Examiner* — Randy W Gibson
(74) *Attorney, Agent, or Firm* — Marshall, Gerstein & Borun LLP

(57) ABSTRACT

A combination weigher of the present invention comprises a plurality of base groups into which a plurality of combination hoppers (4) which are circularly arranged are divided; a plurality of collecting chutes (6A to 6D) which are respectively disposed to respectively correspond to the base groups, a plurality of collecting hoppers (7A to 7D) respectively provided at the outlets of the collecting chutes; and a control means (21) wherein the control means (21) is configured to perform: a combination process to determine p discharge groups each including one or more base groups and perform combination calculation for each of the discharge groups to select combination hoppers forming optimal combination, a process to cause the combination hoppers forming optimal combinations in all discharge groups to discharge the objects to be weighed simultaneously; and a process to sequentially select the discharge groups and to cause the collecting hoppers corresponding to the base groups including the combination hoppers forming the optimal combinations in the discharge groups to discharge the objects to be weighed, according to the selected sequence.

13 Claims, 11 Drawing Sheets

U.S. PATENT DOCUMENTS

| | | | |
|---|---|---|---|
| 4,538,693 A | | 9/1985 | Klopfenstein |
| 4,676,326 A | * | 6/1987 | Konishi ........................... 177/1 |
| 4,844,190 A | * | 7/1989 | Mikami et al. ............ 177/25.18 |
| 5,258,580 A | * | 11/1993 | Bergholt .................... 177/25.18 |
| 7,310,923 B2 | * | 12/2007 | Taylor ............................. 53/502 |
| 7,566,837 B2 | * | 7/2009 | Kawanishi et al. ........ 177/25.18 |
| 2008/0302580 A1 | * | 12/2008 | Kawanishi et al. ........ 177/25.18 |
| 2009/0301792 A1 | * | 12/2009 | Kawanishi ................ 177/25.18 |
| 2010/0096192 A1 | * | 4/2010 | Kawanishi ................ 177/25.18 |
| 2010/0224421 A1 | * | 9/2010 | Kawanishi ................ 177/25.18 |

FOREIGN PATENT DOCUMENTS

| | | |
|---|---|---|
| EP | 0 138 593 A2 | 4/1985 |
| EP | 0 261 406 A2 | 3/1988 |
| JP | 4-3236 Y | 2/1992 |
| JP | 8-1395 B | 1/1996 |

OTHER PUBLICATIONS

Extended European Search Report for European Patent Application No. 05806338.9-1236, dated Dec. 23, 2010.

* cited by examiner

COMBINATIONAL MACHINE THAT PERFORMS A FIRST COMBINATIONAL CALCULATION AMONG EACH OF A PLURALITY OF BASE GROUPS, DISCHARGES THEM INTO RESPECTIVE DISCHARGE CHUTES, AND THEN PERFORMS A SECOND COMBINATIONAL CALCULATION AMONG THE DISCHARGED GROUPS

TECHNICAL FIELD

The present invention relates to a combination weigher which feeds objects to be weighed to a packaging machine or the like.

BACKGROUND ART

Objects to be weighed, such as detergents and confectionary, which are weighed by a combination weigher to have a predetermined weight, are typically packaged by a packaging machine. A schematic construction of a conventional combination weigher which weighs objects to be weighed is shown in FIG. 12. In addition, a schematic construction of the packaging machine disposed below the combination weigher is shown in FIG. 13.

The combination weigher shown in FIG. 12, whose operation is entirely controlled by a control unit 20, is provided with a dispersion feeder 1 at the center of an upper part of the combination weigher. The dispersion feeder 1 has a conical shape and serves to radially disperse objects to be weighed supplied from an external supplying device by vibration. Around the dispersion feeder 1, linear feeders 2 are provided to transfer the objects to be weighed sent from the dispersion feeder 1 into the corresponding feeding hoppers 3 by vibration. The plurality of feeding hoppers 3 and weighing hoppers 4 are disposed below the linear feeders 2 and are arranged circularly in such a manner that each feeding hopper 3 and each weighing hopper 4 correspond to the associated one of the linear feeders 2. The feeding hoppers 3 receive the objects to be weighed transferred from the linear feeders 2 and open their gates when the weighing hoppers 4 disposed therebelow become empty to feed the objects to be weighed to the weighing hoppers 4. Weight sensors 41 such as load cells are attached to the weighing hoppers 4, and measure the weight of the objects to be weighed inside the weighing hoppers 4. The control unit 20 performs combination calculation to select a combination of hoppers to discharge the objects to be weighed therefrom from the plurality of weighing hoppers 4. The objects to be weighed are discharged from the weighing hoppers 4 corresponding to the combination onto the collecting chute 6. The collecting chute 6 is provided below the weighing hoppers 4. The objects to be weighed discharged from the weighing hoppers 4 slide down on the collecting chute 6, and are sent out from an outlet provided in a lower portion thereof to the packaging machine shown in FIG. 13.

In the packaging machine, bags are manufactured while the objects to be weighed discharged from the combination weigher are charged into the bags and packaged. In this packaging machine a sheet of wrapping material 50 withdrawn from a roll of a wrapping material is caused to be wound around a tube 51 by a former 52 to form a cylindrical shape and is suctioned by a pulldown belt 53 to be transferred downwardly, and the superposed vertical edges of the cylindrical wrapping material 50 are sealed (sealing by fusion adhesion) by a vertical sealing machine 54. The objects to be weighed which have been weighed are then charged into the cylindrical wrapping material 50 through the tube 51, and a horizontal sealing machine 55 disposed below the tube 51 seals horizontally across the upper end of a preceding bag and the lower end of a following bag (sealing by fusion adhesion). By this horizontal sealing, the preceding bag is completed with its upper and lower ends sealed since the lower end of the preceding bag has been sealed by the previous horizontal sealing. The center of the horizontally sealed portion is then cut by a cutter built in the horizontal sealing machine 55 so that the preceding bag and the following bag are separated from each other.

DISCLOSURE OF THE INVENTION

In order to adapt the above mentioned conventional combination weigher to a packaging machine operated at a high speed, discharge cycle (interval of the timing of the start of sequential discharging) in which the objects to be weighed are discharged to the packaging machine needs to be shortened. To this end, conventionally, the number of the weighing hoppers is increased to a certain number to constitute so-called double shift or triple shift rather than single shift so that the discharge cycle is shortened to ½ or ⅓ of that of the single shift to be adapted to such a packaging machine. Although this configuration can shorten the discharge cycle, it does not shorten the length from the upper end to the lower end of the batch of the objects to be weighed discharged from the collecting chute 6, or shorten the time taken to accommodate the objects to be weighed discharged from the combination weigher into the bag (bag of the packaging machine). In the high-speed operated packaging machine, the cycle time from one sealing by the horizontal sealing machine 55 to another is short. For this reason, if horizontal sealing is carried out before all of the objects to be weighed discharged from the combination weigher have been accommodated into the bag, the objects to be weighed are disadvantageously stuck in the sealed portion.

A disclosed example of the present invention may solve one or more of the above mentioned problems, and provides a combination weigher which can shorten each discharge time and discharge cycle of the objects to be weighed and can be adapted to a packaging machine operated at a high speed.

Means for Solving the Problems

A combination weigher of the present invention comprises a plurality of base groups including a plurality of circular-arc-shaped hopper lines into which a combination hopper line including a plurality of combination hoppers which are circularly arranged and fed with objects to be weighed are divided; a plurality of collecting chutes which are respectively disposed below the base groups to respectively correspond to the base groups and have outlets at lower parts thereof, each of the collecting chutes collecting the objects to be weighed discharged from the combination hopper in the corresponding base group and discharging the objects to be weighed from the outlet; a plurality of collecting hoppers respectively provided at the outlets of the collecting chutes to respectively correspond to the base groups and the collecting chutes, the collecting hoppers temporarily accumulating the objects to be weighed discharged from the outlets of the collecting chutes and thereafter discharging the objects to be weighed; and a control means; wherein the control means is configured to perform a combination process to determine p (p: plural number less than the number of all base groups) of discharge groups each including one or more base groups and perform combination calculation based on weights of the objects to be weighed which have been fed into the combination hoppers in the discharge groups to select combination hoppers forming combination in which total weight of the objects to be weighed with respect to a target weight is in an allowable range and a difference with respect to the target weight is smallest, an internal discharge process to cause the combination hoppers forming all combinations selected in the discharge groups to discharge the objects to be weighed simultaneously; and an external discharge process to sequentially select the discharge groups and to cause the collecting hoppers corresponding to the base groups including the combination hoppers forming combinations in the discharge groups to discharge the objects to be weighed, according to the selected sequence.

In accordance with this configuration, a plurality of base groups into which the combination hopper line is divided, a plurality of collecting chutes, and a plurality of collecting hoppers are provided to respectively correspond to each other, a plurality of discharge groups each including one or more base groups are determined, and the combination hoppers forming the combination in the respective discharge groups found by the combination calculation discharge the objects to be weighed simultaneously. The objects to be weighed are fed into the corresponding collecting hopper through the corresponding collecting chute and are temporarily accumulated therein. Then, the objects to be weighed are discharged in a state of gathering together satisfactorily sequentially from the collecting hoppers in the respective discharge groups. Therefore, each discharge time of the objects to be weighed discharged from each collecting hopper can be shorted, the discharge cycle can be shortened, and a high-speed operation is achieved. As a result, the combination weigher of the present invention can be adapted to the packaging machine operated at a high speed, and the objects to be weighed can be prevented from being stuck inside the packaging machine.

The combination process may includes a process to determine (p−1) discharge groups by performing, (p−1) times, a series of processes including a first process to find all combination groups each including a combination of k (k: integer of one or more) base groups which do not belong to the discharge groups; a second process to perform, with respect to each of the combination groups, combination calculation based on the weights of the objects to be weighed which have been fed into the combination hoppers within the combination groups to find combination hoppers forming first combination in which a total weight of the objects to be weighed with respect to the target weight is in the allowable range and a difference with respect to the target weight is smallest and to determine total weight of the objects to be weighed in the combination hoppers forming the first combination as optimal combination weight of the combination group; and a third process to select the combination group whose optimal combination weight has a smallest difference with respect to the target weight from all combination groups and to determine the selected combination group or the base group including the combination hoppers forming the first combination within the selected combination group as the discharge group; and a process to perform combination calculation based on the weights of the objects to be weighed which have been fed into the combination hoppers in base groups which do not belong to the (p−1) discharge groups to find combination hoppers forming a second combination in which a total weight of the objects to be weighed with respect to the target weight is in the allowable range and a difference with respect to the target weight is smallest and to determine the base groups which do not belong to the (p−1) discharge groups or the base group including the combination hoppers forming the second combination as p-th discharge group (combination process A).

By performing the combination process A, combination precision (weighing precision) in each discharge group can be improved.

The combination process may includes a process to find all discharge candidate group sets in which at least one discharge candidate group belonging to one discharge candidate group set is different from that belonging to another discharge candidate group set and to calculate a total of differences in each of the discharge candidate group sets, by repeating, plural times, a loop process including a first combination process to determine (p−1) discharge candidate groups each including one or more base groups and to find optimal combination weight in each of the discharge candidate groups; a second combination process to determine p-th discharge candidate group including one or more base groups and to find optimal combination weight of the p-th discharge candidate group and add the p-th discharge candidate group and the (p−1) discharge candidate groups to form one discharge candidate group set; and a calculation process to calculate a total of differences between the optimal combination weights and the target weight with respect to the p discharge candidate groups in the discharge candidate group set; and a process to determine, as the discharge groups, the p discharge candidate groups in the discharge candidate group set in which the total of differences is smallest, which are selected from the discharge candidate group sets; the first combination process in a loop process with the same ordinal number, in the loop process repeated plural times, is a process to determine the (p−1) discharge candidate groups by repeating, (p−1) times, a series of processes including a first process to find arbitrary combination group including a combination of k (k: integer of one or more) base groups which do not belong to the discharge candidate groups by a second process; a second process to perform combination calculation with respect to the combination groups, based on the weights of the objects to be weighed which have been fed into the combination hoppers within the combination groups to select combination hoppers forming first combination in which a total weight of the objects to be weighed with respect to the target weight is in the allowable range and a difference with respect to the target weight is smallest and to determine the combination group or the base groups including the combination hoppers forming the first combination within the combination group as one discharge candidate group and the total weight of the objects to be weighed in the combination hoppers forming the first combination as optimal combination weight of the discharge candidate group, the second combination process in the loop process with the same ordinal number, is a process to perform combination calculation based on the weights of the objects to be weighed which have been fed into the combination hoppers within base groups which do not belong to the (p−1) discharge candidate groups to select combination hoppers forming second combination in which total weight of the objects to be weighed with respect to the target weight is in the allowable range and a difference with respect to the target weight is smallest and to determine the base groups which do not belong to the (p−1) discharge candidate groups or the base groups including the combination hoppers forming the second combination as the p-th discharge candidate group and the total weight of the objects to be weighed in the combination hoppers forming the second combination as optimal combination weight of the p-th discharge candidate group; and to add the p-th discharge candidate groups and (p−1)

discharge candidate groups to form one discharge candidate group set (combination process B).

By performing the combination process B, combination precision (weighing precision) in each discharge group can be improved. In addition, in contrast to the case where the combination process A is performed, the total weight of the optimal combination weights of the p discharge groups can be reduced, and thus consumption amounts of the objects to be weighed can be reduced.

In the case of the combination process A, in the process to determine the (p−1) discharge groups by performing the series of processes including the first, second, and third processes (p−1) times, the number k of the base groups forming the combination group may be changed at least once.

In the case of the combination process B, in the first combination process to determine the (p−1) discharge candidate groups by performing the series of processes including the first and second processes (p−1) times, the number k of the base groups forming the combination group may be changed at least once.

The number of the discharge groups determined in the combination process may be set to two (p=2) or three (p=3). When the number of the discharge groups is two, the objects to be weighed can be discharged twice in one weighing cycle, while when the number of the discharge groups is three, the objects to be weighed can be discharged three times in one weighing cycle.

The combination hoppers included in the base groups may be set to be equal in number. In this case, the total number of the combination hoppers can be divided by the number of base groups.

The combination hoppers included in at least one base group of all base groups may be different in number from the combination hoppers included in another base group. Thus, the combination hoppers included in the base groups is not necessarily equal in number.

The combination hoppers may be weighing hoppers which weigh weights of the objects to be weighed fed into the weighing hoppers.

The combination hopper line may include upper and lower combination hopper lines; and the combination hoppers on the upper combination hopper line may be weighing hoppers which weigh weights of the objects to be weighed fed into the weighing hoppers; the combination hoppers on the lower combination hopper line may be memory hoppers which are provided to respectively correspond to the weighing hoppers and are fed with the objects to be weighed which have been weighed by the weighing hoppers, and the weighing hoppers may be each capable of selectively discharging the objects to be weighed to the corresponding memory hopper or the corresponding collecting chute.

The combination weigher may further comprise a plurality of weighing hoppers disposed above the combination hoppers to respectively correspond to the combination hoppers, for weighing weights of the objects to be weighed fed into the weighing hoppers; wherein the combination hoppers are memory hoppers each including two accommodating chambers into which the objects to be weighed which have been weighed by the weighing hopper are fed, the accommodating chambers being capable of independently discharging the objects to be weighed; wherein the weighing hoppers are each capable of selectively discharging the objects to be weighed to one of the two accommodating chambers of the corresponding memory hopper; and wherein the control means is configured to perform combination calculation in the combination process based on weights of the objects to be weighed which have been fed into the accommodating chambers of the memory hoppers to determine combination of the accommodating chambers of the memory hoppers, and to cause the accommodating chambers forming the determined combination to discharge the objects to be weighed in the internal discharge process and to cause the collecting hopper corresponding to the base groups including the memory hoppers having the accommodating chambers forming the determined combination to discharge the objects to be weighed in the external discharge process.

The combination hoppers may be weighing hoppers each of which includes two weighing chambers and weighs weights of the objects to be weighed which have been fed into the weighing chambers, the weighing chambers being independently discharging the objects to be weighed; and the control means may be configured to perform combination calculation in the combination process based on the weights of the objects to be weighed which have been fed into the weighing chambers of each weighing hopper to determine combination of the weighing chambers of the weighing hopper and to cause the weighing chambers forming the determined combination to discharge the objects to be weighed in the internal discharge process and to cause the collecting hopper corresponding to the base groups including the weighing hoppers having the weighing chambers forming the determined combination to discharge the objects to be weighed in the external discharge process.

The combination weigher may further comprise a plurality of weighing hoppers disposed above the combination hoppers to respectively correspond to the combination hoppers, each of which includes two weighing chambers and weighs weights of the objects to be weighed which have been fed into the weighing chambers, the weighing chambers being independently discharging the objects to be weighed; and wherein the combination hoppers may be memory hoppers each including two accommodating chambers corresponding to the weighing chambers of the corresponding weighing hoppers, the objects to be weighed which have been fed from the corresponding weighing chambers being fed into the accommodating chambers, the accommodating chambers being capable of independently discharging the objects to be weighed; wherein the control means may be configured to perform combination calculation in the combination process based on weights of the objects to be weighed which have been fed into the accommodating chambers of the memory hoppers to determine combination of the accommodating chambers of the memory hoppers, and to cause the accommodating chambers forming the determined combination to discharge the objects to be weighed in the internal discharge process and to cause the collecting hopper corresponding to the base groups including the memory hoppers having the accommodating chambers forming the determined combination to discharge the objects to be weighed in the external discharge process.

The present invention may be configured as described above, and it is possible to provide a combination weigher which can reduce each discharge time of the objects to be weighed, can shorten the discharge cycle and can be adapted to the packaging machine operated at a high speed.

The above and further objects and features of the invention will more fully be apparent from the following detailed description with accompanying drawings.

DESCRIPTION OF THE REFERENCE NUMERALS

Figure 1A:
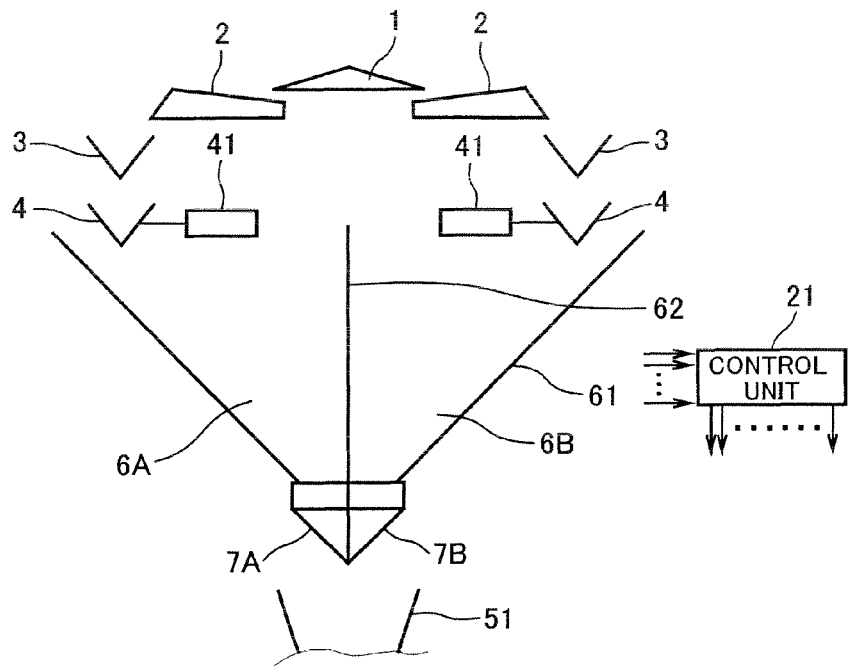
FIG. 1(*a*) is a schematic diagram of a cross section seen from laterally of a combination weigher according to an embodiment of the present invention, and FIG. 1(*b*) is a schematic diagram of collecting chutes and collecting hoppers of the combination weigher according to the embodiment of the present invention as seen from above.

1 Dispersion feeder
2 Linear feeder
3 Feeding hopper
4 Weighing hopper
5 Memory hopper
6A-6D Collecting chutes
7A-7D Collecting hoppers
7a-7d Collecting hoppers
21 Control unit

BEST MODE FOR CARRYING OUT THE INVENTION

Hereinafter, preferred embodiments of the present invention will be described with reference to the drawings.

Embodiment 1

Figure 1B:
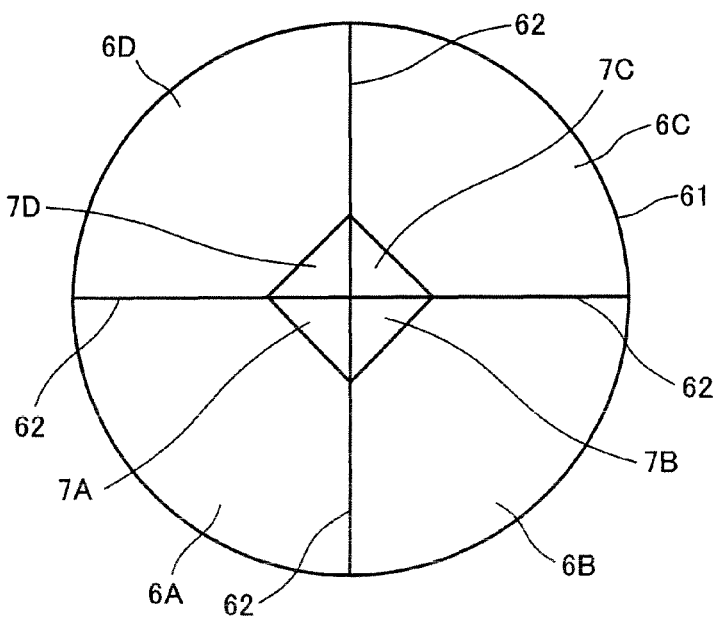

FIG. 1(a) is a schematic diagram of a cross section of a combination weigher according to an embodiment of the present invention as seen from laterally, and FIG. 1(b) is a schematic diagram of collecting chutes and collecting hoppers of the combination weigher according to the embodiment of the present invention as seen from above.

Figure 2:
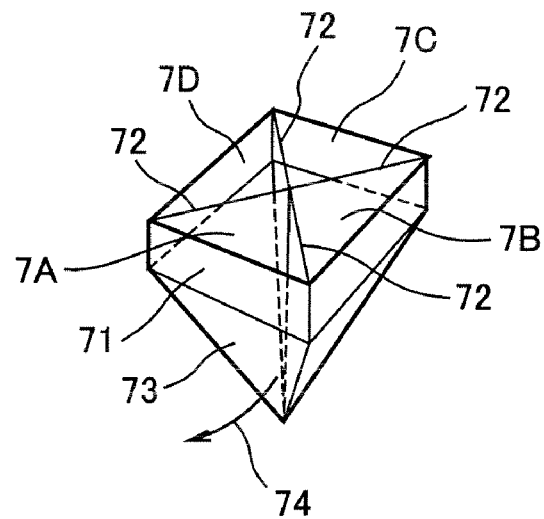
FIG. 2 is a schematic perspective view of the collecting hoppers shown in FIGS. 1(a) and 1(b)
Figure 12:
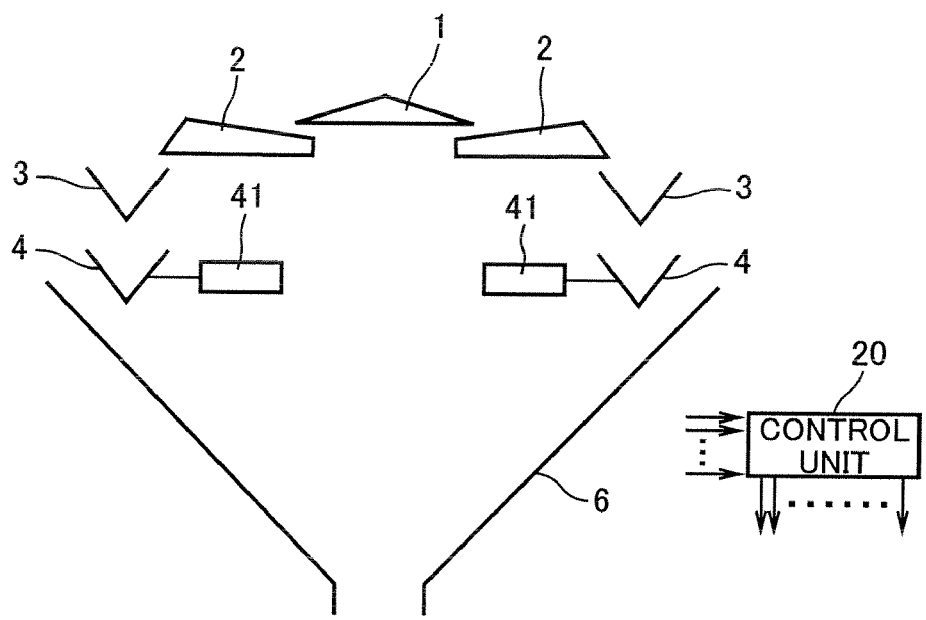
FIG. 12 is a schematic diagram showing a construction of the conventional combination weigher.
Figure 13:
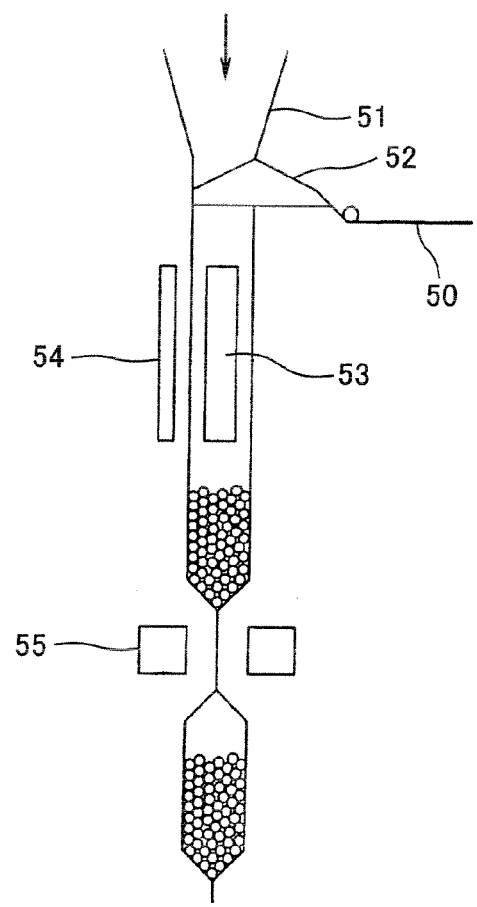
FIG. 13 is a schematic diagram showing a construction of a packaging machine disposed below the combination weigher.

The combination weigher of this embodiment is provided with a dispersion feeder 1 at the center of an upper part of the combination weigher. The dispersion feeder 1 has a conical shape and serves to radially disperse objects to be weighed supplied from the external supplying device by vibration. Around the dispersion feeder 1, linear feeders 2 are provided to transfer the objects to be weighed sent from the dispersion feeder 1 into each of feeding hoppers 3 by vibration. The plurality of feeding hoppers 3 and weighing hoppers 4 are disposed below the linear feeders 2 and are arranged circularly in such a manner that each feeding hopper 3 and each weighing hopper 4 correspond to the associated one of the linear feeders 2. The feeding hoppers 3 receive the objects to be weighed transferred from the linear feeders 2 and open their gates when the weighing hoppers 4 disposed therebelow become empty to feed the objects to be weighed to the weighing hoppers 4. Weight sensors 41 such as load cells are attached to the weighing hoppers 4, and measure the weights of the objects to be weighed inside the weighing hoppers 4. The configuration described above is the same as that of the prior art example shown in FIG. 12. In this embodiment, collecting chutes 6A-6D which are four separate elements are provided below the weighing hoppers 4, and collecting hoppers 7A-7D are provided at the outlets of the collecting chutes 6A-6D, respectively. A chute 61 having a substantially inverted conical shape is partitioned into four chutes by partition walls 62, forming the collecting chutes 6A-6D. Each of these four collecting chutes 6A-6D is positioned to correspond to ¼ in number of all the weighing hoppers 4 arranged circularly to receive the objects to be weighed discharged from ¼ in number of the weighing hoppers 4. The objects to be weighed discharged from the weighing hoppers 4 slide down on the collecting chutes 6A-6D corresponding to the weighing hoppers 4 and are temporarily accumulated in the collecting hoppers 7A-7D. FIG. 2 shows a simplified perspective view of the collecting hoppers 7A-7D. Each of the collecting hoppers 7A-7D constitutes a portion for accommodating the objects to be weighed by a side plate 71, two partition plates 72 and a gate 73. Each of the partition plates 72 is shared by adjacent collecting hoppers, and thus four collecting hoppers 7A-7D are integrally formed. The objects to be weighed are discharged from each of the collecting hoppers 7A-7D by opening the gate 73 outward (for example, the direction in which the gate 73 of the collecting hopper 7A is opened is shown by an arrow 74). The control unit 21 controls the operation of the entire combination weigher and also performs combination process. A packaging machine shown in FIG. 13 is disposed below this combination weigher, and the objects to be weighed discharged from each of the collecting hoppers 7A-7D are fed into an inlet which is a widened upper part of a cylindrical tube 51 of the packaging machine.

Subsequently, the operation of the combination weigher of this embodiment will be described. In this embodiment, for example, in the configurations of FIGS. 1(a) and 1(b), the four collecting chutes 6A to 6D respectively correspond to the collecting hoppers 7A to 7D, and it is assumed that the weighing hoppers 4 corresponding to the collecting chute 6A and the collecting hopper 7A is a base group A, the weighing hoppers 4 corresponding to the collecting chute 6B and the collecting hopper 7B is a base group B, the weighing hoppers 4 corresponding to the collecting chute 6C and the collecting hopper 7C is a base group C, and the weighing hoppers 4 corresponding to the collecting chute 6D and the collecting hopper 7D is a base group D.

The control unit 21 performs combination process described later in detail to find a plurality of discharge groups formed by combining the base groups. When determining each discharge group, the control unit 21 performs combination calculation based on measured values (weights of the objects to be weighed inside the weighing hoppers 4 which are measured by the weight sensors 41) of the weighing hoppers 4 belonging to the discharge group, to determine a combination of the hoppers which will discharge the objects to be weighed, which are selected from the weighing hoppers 4 belonging to that discharge group. By opening and closing the gates of the weighing hoppers 4 corresponding to the determined combination, the objects to be weighed are discharged onto the collecting chute and are accumulated in the collecting hopper. Furthermore, the control unit 21 sequentially opens the gates of the collecting hoppers (7A to 7D) respectively corresponding to the discharge groups in response to a feed command signal from the packaging machine, thereby discharging the objects to be weighed from the collecting hoppers whose gates have been opened, and feeding them into the cylindrical tube 51 of the packaging machine.

Figure 3:
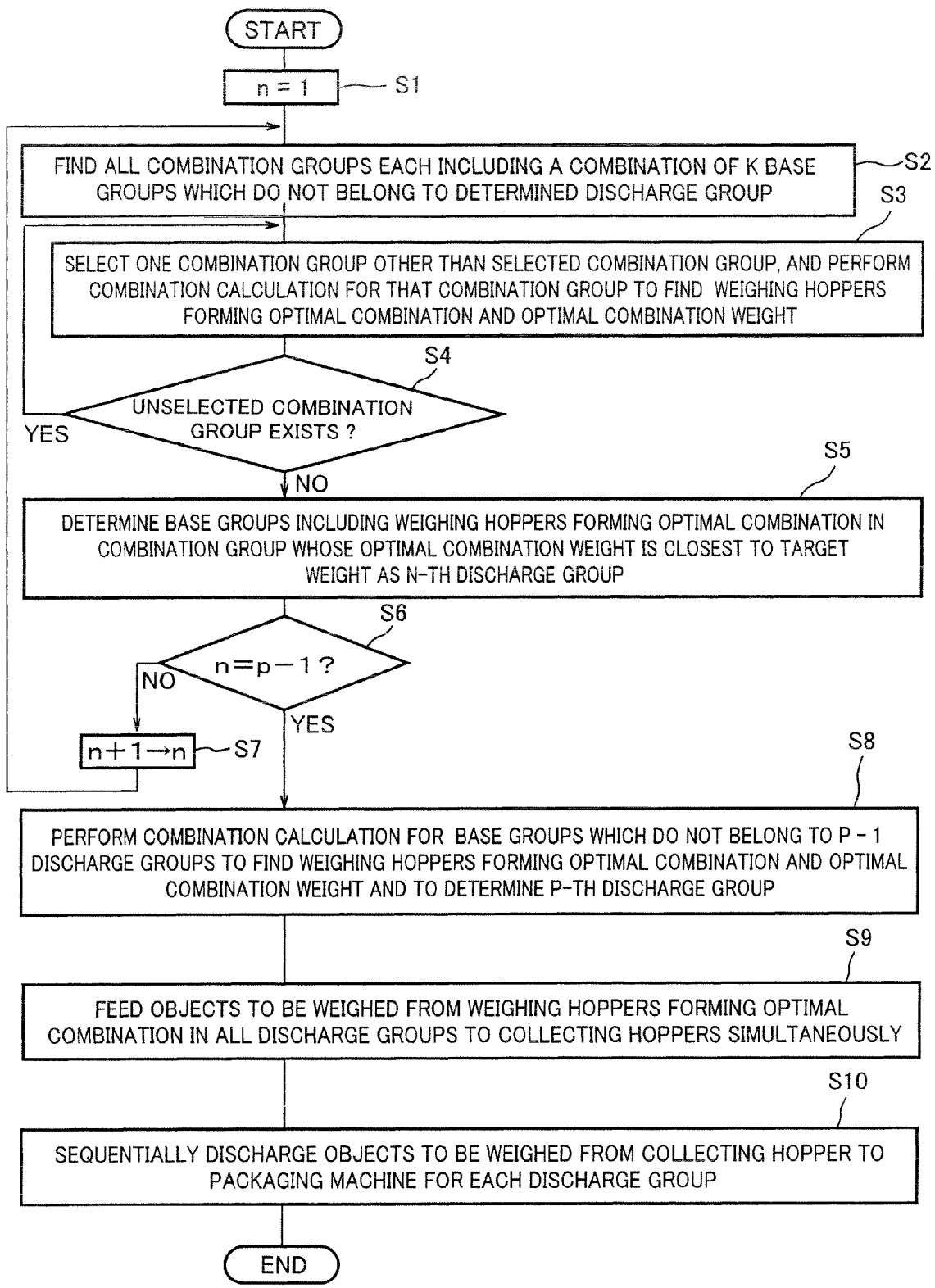
FIG. 3 is a flowchart of an operation of the combination weigher according to a first embodiment of the present invention.

FIG. 3 is a flowchart showing the operation of the combination weigher of this embodiment. It is assumed that the number of discharging of the objects to be weighed to the outside (e.g., packaging machine) in one weighing cycle is p (p: plural number). The above mentioned combination process is steps S1 to S8. The control unit 21 contains a memory therein, and is configured to store in the memory required information found in the combination process (information as to which base group weighing hoppers form the combination groups and the discharge groups described later, information indicating the weighing hoppers forming optimal combination, information indicating optimal combination weight, etc).

First of all, in step S1, n is initialized to 1. n indicates the number of discharge groups found in step S5 described later.

In step S2, combination groups each including a combination of k base groups which do not belong to the determined discharge group are found. Since there is no determined discharge group initially, groups each including a combination of k base groups selected from all the base groups are determined as the combination groups.

In step S3, one combination group other than the selected combination group is selected, and combination calculation is performed based on the measured values of the weighing hoppers 4 within that combination group to select the weighing hoppers 4 forming a combination (optimal combination) in which a total measured value with respect to the target weight is in an allowable range and a difference with the target weight is smallest, and to determine the total measured value of the weighing hoppers 4 forming the optimal combination as an optimal combination weight. Since there is no selected combination group initially, an arbitrary combination group is selected from all combination groups, and the above combination calculation is performed.

In step S4, it is determined whether or not there is a combination group that has not been selected for the combination calculation in step S3, among the combination groups selected in step S2. If it is determined that there is in step S4, step S3 is repeated for all the combination groups, and thereafter the process moves to step S5.

In step S5, a combination group whose optimal combination weight is closest to the target weight is found from all the combination groups, and the base group including the weighing hoppers 4 forming the optimal combination within that combination group is determined as n-th discharge group.

Then, in step S6, it is determined whether or not the n is equal to p−1, and if it is determined that the n is not equal to p−1, one is added to n in step S7, and the process from step S2 is repeated, whereas if it is determined that the n is equal to p−1 in step S6, the process moves to step S. That is, steps S2 to S5 are repeated until p−1 discharge groups are determined.

In step S8, the combination calculation is performed based on the measured values of the weighing hoppers 4 within the base groups which do not belong to the p−1 discharge groups to select the weighing hoppers 4 forming a combination (optimal combination) in which a total measured value with respect to the target weight is in an allowable range and a difference with the target weight is smallest and to determine the total measured value of the weighing hoppers 4 forming the optimal combination as an optimal combination weight. The base groups including the weighing hoppers 4 forming the optimal combination is determined as p-th discharge group.

Through the combination process in step S1 through S8, p discharge groups are determined.

In step S9, gates of the weighing hoppers 4 forming the optimal combination in the p discharge groups are opened simultaneously to feed the objects to be weighed to the collecting hoppers.

In step S10, every time the feed command signal is received from, for example, the packaging machine, the gates of the collecting hoppers corresponding to the respective discharge groups are sequentially opened to discharge to the objects to be weighed to the packaging machine. In brief, every time the feed command signal is received from the packaging machine, the objects to be weighed having the optimal combination weight are discharged from each discharge group.

A case where the above described process, specifically, the combination process in step S1 to S8 is applied to the configurations of FIGS. 1(*a*) and 1(*b*) will be described in detail. Here it is assumed that each of base groups A to D includes six weighing hoppers 4, the combination group is formed by combining two base groups (k=2), four weighing hoppers 4 are selected as the weighing hoppers 4 forming the optimal combination, and the number of discharging of the objects to be weighed in one weighing cycle is two (p=2).

First of all, in step S1, n is initialized to 1.

In step S2, since there is no determined discharge group initially, two base groups selected from all the base groups A to D, for example, the base groups A and B are combined to form one combination group. In the same manner, combination groups of the base groups A and C, the base groups A and D, the base groups B and C, the base groups B and D, and the base groups C and D are created, and thus 6 (=4C2) combination groups in total are found.

In step S3, since there is no selected combination group initially, an arbitrary combination group, for example, the combination group of the base groups A and B, is selected from all the combination groups, the combination calculation is performed for that combination group to select four weighing hoppers 4 forming the optimal combination and to determine the total measured value of the weighing hoppers 4 forming the optimal combination as the optimal combination weight. In this case, the weighing hoppers 4 forming the optimal combination are selected from 495 (=12C4) combinations.

In step S4, if it is determined that there are any combination groups which have not been selected as the combination groups for which the combination calculation is performed in step S3 among the combination groups found in step S2, step S3 is repeated. In this manner, the weighing hoppers 4 forming the optimal combination and the optimal combination weight are found for each of the six combination groups.

In step S5, the combination group whose optimal combination weight is closest to the target weight is selected from all the combination groups, and the base groups including the weighing hoppers 4 forming the optimal combination within that combination group is determined as a first (n=1) discharge group. The weighing hoppers 4 forming the optimal combination within that discharge group are selected from 4C2×12C4=2970 combinations. Since each base group includes six weighing hoppers 4, the four weighing hoppers 4 selected to form the optimal combination may belong to both or one of, for example, the base groups A and B forming that combination group. If the weighing hoppers 4 forming the optimal combination belong to both of the base groups A and B, then the base groups A and B are the discharge groups. If the weighing hoppers 4 belong only to the base group A, then only the base group A is the discharge group, whereas if the weighing hoppers 4 belong only to the base group B, then only the base group B is the discharge group.

Then, in step S6, it is determined whether or not the n is equal to p−1. In this example, n=1, p=2, and p−1=1. Since it is determined that n is equal to p−1, the process moves to step 8.

If the base groups B and C have been determined as the discharge group in step S5, in step S8, the combination calculation is performed based on the measured values of the weighing hoppers 4 within the base groups A and D which do not belong to the discharge group to select four weighing hoppers 4 forming the optimal combination and to determine a total measured value of the weighing hoppers 4 forming that optimal combination as the optimal combination weight. And, the base groups including the weighing hoppers 4 forming that optimal combination are determined as second discharge group. If the base group A has been determined as the discharge group in step S5, then the combination calculation is performed based on the measured values of the weighing hoppers 4 within three base groups B, C, and D which do not belong to the discharge group to select four weighing hoppers 4 forming the optimal combination and to determine the total measured value of the weighing hoppers 4 forming that optimal combination as optimal combination weight. And, the base group including the weighing hoppers 4 forming the optimal combination is determined as the second discharge group. Through the above mentioned process, two discharge groups are determined.

Subsequently, a combination process in step S1 to S8 in a case where there are seven base groups (seven collecting chutes and seven collecting hoppers) will be described. Here it is assumed that each of seven base groups A to G includes four weighing hoppers 4, the combination group is formed by combining two base groups (k=2), four weighing hoppers 4 are selected as the weighing hoppers 4 forming the optimal combination, and the number of discharging of the objects to be weighed in one weighing cycle is three (p=3).

First of all, in step S1, n is initialized to 1.

In step S2, since there is no determined discharge group initially, combinations of two base groups selected from the base groups A to D, 21 (=7C2) combination groups including the base groups A and B, A and C, . . . A and G, B and C, B and D, . . . , B and G, C and D, . . . F and G, are found.

In step S3, as in the case where the number of base groups is four, since there is no determined discharge group initially, an arbitrary combination group, for example, the combination group of the base groups A and B, is selected from all the combination groups, the combination calculation is performed for that combination group to select weighing hoppers 4 forming the optimal combination and to determine the total measured value of the weighing hoppers 4 forming the optimal combination as the optimal combination weight. In this case, the weighing hoppers 4 forming the optimal combination are selected from 70 (=8C4) combinations.

In step S4, if it is determined that there are any combination groups which have not been selected as the combination groups for which the combination calculation is performed in step S3, among the combination groups found in step S2, step S3 is repeated. In this manner, the weighing hoppers 4 forming the optimal combination and the optimal combination weight are found for each of the twenty one combination groups.

In step S5, the combination group whose optimal combination weight is closest to the target weight is found from all the combination groups, and the base group including the weighing hoppers 4 forming the optimal combination within that combination group is determined as a first (n=1) discharge group. The weighing hoppers 4 forming the optimal combination within that discharge group are selected from 7C2×8C4=1470 combinations. Since each base group includes four weighing hoppers 4, the four weighing hoppers 4 selected to form the optimal combination may belong to both or one of, for example, the base groups A and B forming that combination group.

Then, in step S6, it is determined whether or not the n is equal to p−1. In this example, n=1, p=3, and p−1=2. Since it is determined that n is not equal to p−1, in step S7, n=2 is set and the process returns to step S2.

If the base groups A and B have been determined as the discharge group in step S5, in step S2, 10 (=5C2) combination groups including two base groups selected from five base groups C to G, excluding the base groups A and B are found. Also, if only one base group (e.g., base group A) is determined as the discharge group, then 15 (=6C2) combination groups including two base groups selected from six base groups B to G, excluding the base group A are found.

Following this, steps S3 to S5 are performed in the same manner as described above to determine second (n=2) discharge group. Then in step S6, n=2, p=3, and p−1=2. Since it is determined that n is equal to p−1, the process moves to step 8.

If the base group A is determined as the first discharge group and the base groups B and C are determined as the second discharge group, in step S8, the combination calculation is performed based on the measured values of the weighing hoppers 4 within the base groups D to G which do not belong to the discharge groups to select the weighing hoppers 4 forming the optimal combination and to determine a total measured value of the weighing hoppers 4 forming the optimal combination as optimal combination weight. And, the base group including the weighing hoppers 4 forming the optimal combination is determined as the third discharge group. Through the above process, three discharge groups are determined.

Subsequently, a combination process in step S1 to S8 in a case where there are three base groups (three collecting chutes and three collecting hoppers) will be described. Here it is assumed that each of the three base groups A to C includes eight weighing hoppers 4, four weighing hoppers 4 are selected as the weighing hoppers 4 forming the optimal combination, and the number of discharging of the objects to be weighed in one weighing cycle is two (p=2). When the number of base groups is four or more, it is desirable to combine plural base groups to form a combination group. However, when the number of base groups is three as in this example, each combination group includes one base group (k=1). In other words, the combination group is identical to the base group.

First of all, in step S1, n is initialized to 1.

In step S2, since there is no determined discharge group initially, the base groups A, B, and C are combination groups.

In step S3, as in the case where the number of base groups is four, since there is no selected combination group initially, an arbitrary combination group, for example, the combination group consisting of the base group A is selected from all the combination groups, the combination calculation is performed for that combination group to select weighing hoppers 4 forming the optimal combination and to determine a total measured value of the weighing hoppers 4 forming the optimal combination as the optimal combination weight.

Depending on step S4, step S3 is repeated. In this example, weighing hoppers 4 forming the optimal combination and the optimal combination weight are found from the combination groups each consisting of the base group A, B, or C.

In step S5, the combination group whose optimal combination weight is closest to the target weight is selected as first (n=1) discharge group from all the combination groups (A, B, and C). The weighing hoppers 4 forming the optimal combination within that discharge group are selected from 3C1×8C4=210 combinations.

Then in step S6, n=1, p=2, and p−1=1. Since it is determined that n is equal to P−1 the process moves to step 8.

If the base group A has been determined as the first discharge group, in step S8, the combination calculation is performed based on the measured values of the weighing hoppers 4 within the base groups B and C which do not belong to the discharge groups to select the weighing hoppers 4 forming the optimal combination and to determine a total measured value of the weighing hoppers 4 forming the optimal combination as optimal combination weight. The base group including the weighing hoppers 4 forming the optimal combination is determined as second discharge group. Through the above process, two discharge groups are determined.

Whereas in the process shown in FIG. 3, the combination group whose optimal combination weight is closest to the target weight is selected from all combination groups and the base group including the weighing hoppers 4 forming the optimal combination within that combination group is determined as the discharge group in step S5, the combination group whose optimal combination weight is closest to the target weight may alternatively be directly determined as the discharge group (in this case, the combination precision may be reduced slightly). Also, whereas the combination calculation is performed based on the measured values of the weighing hoppers 4 within the base groups which do not belong to p−1 discharge groups to determine the base group including the weighing hoppers 4 forming the optimal combination as p-th discharge groups in step S8, base groups which do not belong to the p−1 discharge groups may alternatively be determined as the p-th discharge group (Note that the combination calculation is also performed in this case). In these cases, in step S10, in the respective discharge groups for sequentially discharging the objects to be weighed, only the collecting hoppers corresponding to the base groups including the weighing hoppers 4 forming the optimal combination within the discharge groups may be opened and closed to discharge the objects to be weighed.

Furthermore, when step S2 is repeated, the number k of base groups forming the combination group may be changed. For example, the number of base groups forming the combination group in second step S2 may be set more than the number of base groups in first step S2.

Figure 4:
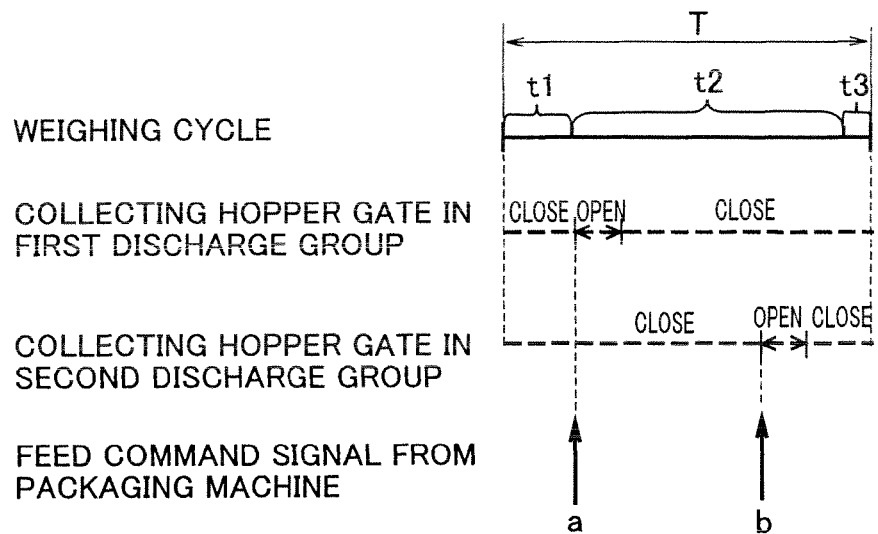
FIG. 4 is a timing chart showing an example of the operation of the combination weigher according to the embodiment of the present invention.

FIG. 4 is a timing chart of the operation of the combination weigher in the case where two discharge groups are determined in the above mentioned combination process. Whereas one weighing cycle and discharge timings of the collecting hoppers in that weighing cycle are illustrated in FIG. 4, such operation is repeated in succession. In FIG. 4, first and second discharge groups are first and second discharge groups in the combination process, respectively. Alternatively, numbers (1, 2, 3, . . . ) indicating discharge priority may be assigned to all base groups (or collecting hoppers), and smallest numbers of the base groups belonging to the first and second discharge groups in the combination process may be compared to each other, and the discharge group including the base group with smaller number and the discharge group including the base group with larger number may be determined as the first and second discharge groups, respectively.

One weighing cycle in the combination weigher consists of a discharge time t1, a stabilization time t2 and a combination time t3. The discharge time t1 is a time taken to open and close the gates of the weighing hoppers 4 forming the optimal combination operated to feed the objects to be weighed to the collecting hopper and to open and close the gates of the feeing hoppers operated to feed the objects to be weighed to these weighing hoppers 4. The stabilization time t2 is a stabilization time of the weight sensors 41 attached to the weighing hoppers 4. The combination time t3 is a time taken to perform the combination process and may include wait time before the discharge time in next weighing cycle.

As shown in FIG. 4, the gate of the collecting hopper corresponding to the first discharge group is opened to discharge the objects to be weighed to the packaging machine in response to a feed command signal output from the packaging machine at timing a, and the gate of the collecting hopper corresponding to the second discharge group is opened to discharge the objects to be weighed to the packaging machine in response to a feed command signal output from the packaging machine at timing b. By operating the discharge groups in a predetermined sequence with a difference of T/2 time (T indicates time of one weighing cycle), the discharge can be performed twice faster than in a case where the entire apparatus operates as a single combination weigher, thereby allowing the combination weigher to be adapted to a packaging machine operated at a high speed. Moreover, the objects to be weighed discharged from the weighing hoppers 4 are fed into the corresponding collecting hoppers (7A-7D) through the corresponding collecting chutes (6A-6D) to be temporarily accumulated therein. Then, the objects to be weighed are discharged from the collecting hoppers (7A-7D) in a state of gathering together satisfactorily. Therefore, each discharge time of the objects to be weighed discharged from the collecting hopper corresponding to each discharge group can be shortened and the objects to be weighed can be also prevented from being stuck inside the packaging machine.

Figure 5:
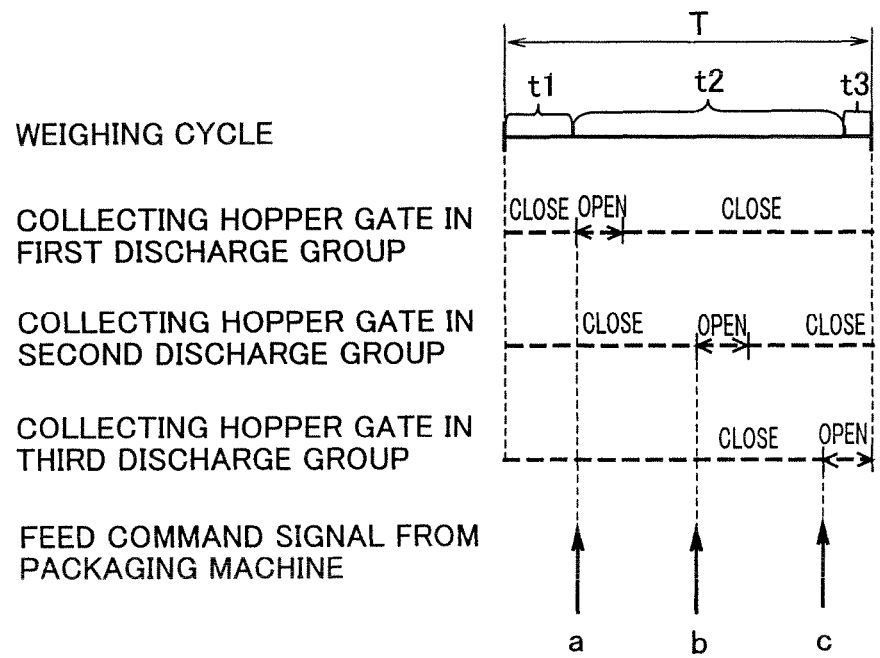
FIG. 5 is a timing chart showing an example of the operation of the combination weigher according to the embodiment of the present invention.

FIG. 5 is a timing chart of the operation of the combination weigher in the case where three discharge groups are determined in the above mentioned combination process. Whereas one weighing cycle and discharge timings of the collecting hoppers in that weighing cycle are illustrated in FIG. 5 as in FIG. 4, such operation is repeated in succession. In FIG. 5, first, second and third discharge groups are first, second and third discharge groups in the combination process, respectively. Alternatively, numbers (1, 2, 3, . . . ) indicating discharge priority may be assigned to all base groups (or collecting hoppers), and smallest numbers of the base groups belonging to the first, second, and third discharge groups in the combination process may be compared to each other, and the discharge group including the base group with smallest number, the discharge group including the base group with the second smallest number, and the discharge group including the base group with the third smallest number may be determined as the first, second and third discharge groups, respectively.

As in the configuration of FIG. 4, one weighing cycle in the combination weigher consists of the discharge time t1, the stabilization time t2, and the combination time t3.

In the configuration of FIG. 5, the gate of the collecting hopper corresponding to the first discharge group is opened to discharge the objects to be weighed to the packaging machine in response to a feed command signal output from the packaging machine at timing a, the gate of the collecting hopper corresponding to the second discharge group is opened to discharge the objects to be weighed to the packaging machine in response to a feed command signal output from the packaging machine at timing b, and the gate of the collecting hopper corresponding to the third discharge group is opened to discharge the objects to be weighed to the packaging machine in response to a feed command signal output from the packaging machine at timing c. By operating the discharge groups in a predetermined sequence with a difference of T/3 time (T indicates time of one weighing cycle), the discharge can be performed three times faster than in a case where the entire apparatus operates as a single combination weigher, thereby allowing the combination weigher to be adapted to a packaging machine operated at a high speed. Moreover, as in the configuration of FIG. 4, the objects to be weighed discharged from the weighing hoppers 4 are temporarily accumulated in the corresponding collecting hoppers and are discharged from the collecting hoppers in a state of gathering together satisfactorily. Therefore, the each discharge time of the objects to be weighed discharged from the collecting hoppers corresponding to the respective discharge groups can be shortened and the objects to be weighed can be also prevented from being stuck inside the packaging machine.

In this embodiment, the number of collecting chutes and the collecting hoppers, i.e., the number of base groups is required to be set to three or more, and is desirably set to four or more. This is because when the number is four or more, the combination group in the combination process can be formed by combining plural base groups, and more combinations can be created for the combination calculation in step S3 when the weighing hoppers in the base groups is equal.

Embodiment 2

The configuration of the combination weigher of this embodiment is identical to that of the first embodiment shown in, for example, FIGS. 1(a) and 1(b), and will not be further described.

Then, the operation of the combination weigher of this embodiment will be described. The significant distinction between the first and second embodiments is a method of the combination process executed by the control unit 21.

Figure 6:
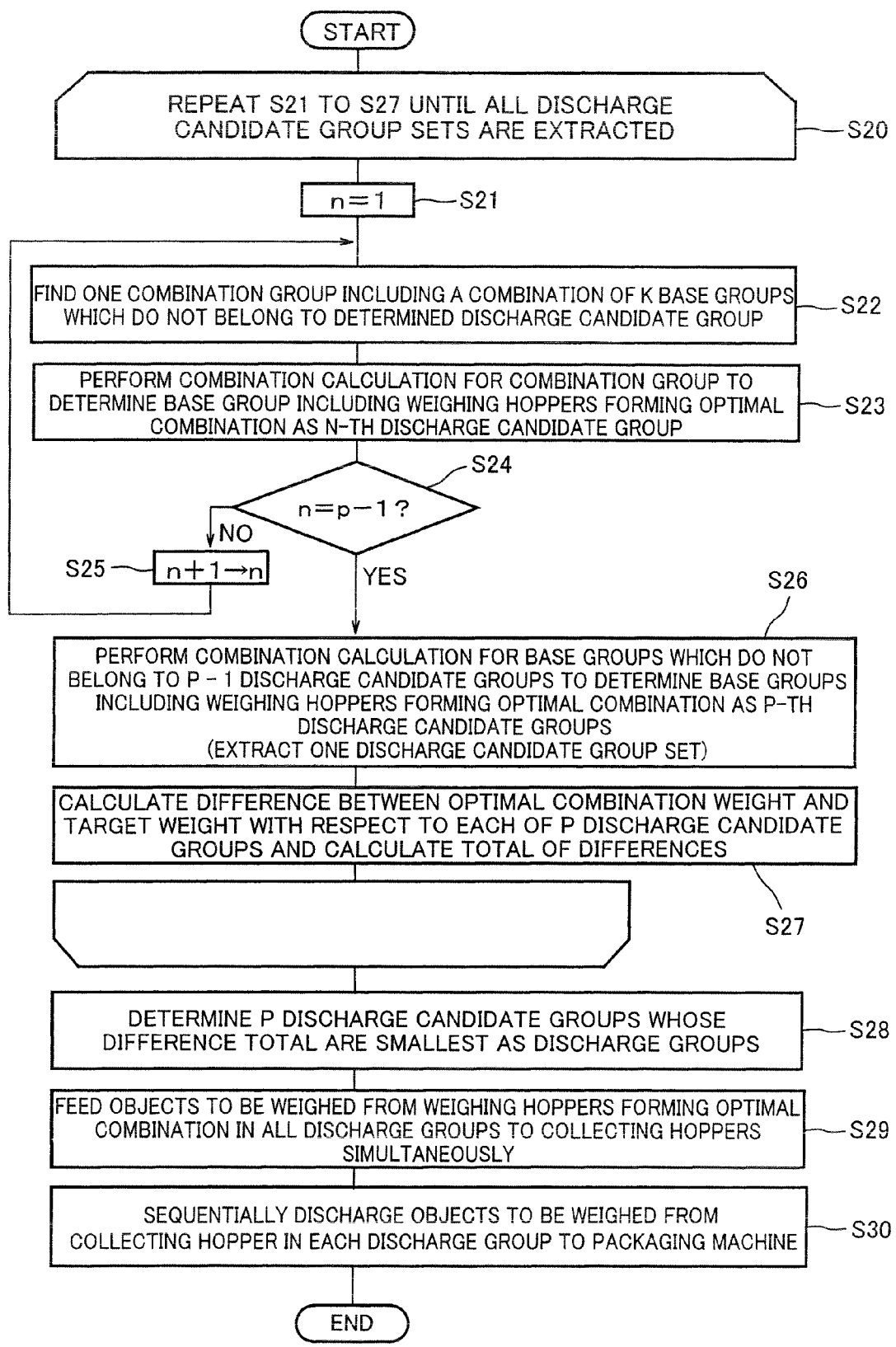
FIG. 6 is a flowchart of an operation of a combination weigher according to a second embodiment of the present invention.

FIG. 6 is a flowchart showing the operation of the combination weigher of this embodiment. It is assumed that the number of discharging of the objects to be weighed in one weighing cycle to the outside (e.g., packaging machine) is p (p is plural numbers). The above mentioned combination process is steps S20 to S28. The control unit 21 contains a memory therein, and is configured to store in the memory required information found in the combination process (information as to which base group weighing hoppers form combination groups, discharge candidate groups and discharge groups, information indicating the weighing hoppers forming optimal combination, information indicating optimal combination weight, information indicating differences and total of differences calculated in step S27, etc).

The repeat step S20 is to find all discharge candidate group sets and to find a total of differences mentioned later for each discharge group set by repeating the following steps S21 through S27.

First, in step S21, n is initialized to 1. n indicates the number of discharge candidate groups found in step S23 mentioned later.

In step S22, an arbitrary combination group including a combination of k base groups which do not belong to the determined discharge candidate group in the repeat step S20 with the same ordinal number while the repeat step S20 (S21 through S27) is repeated is found. Since there is no determined discharge candidate group, one group including a combination of k base groups selected from all base groups is one combination group.

In step S23, the combination calculation is performed based on the measured values of the weighing hoppers 4 within the combination groups found in step S22 to select weighing hoppers 4 forming combination (optimal combination) in which a total measured value with respect to a target weight is in an allowable range and a difference with the target weight is smallest, and to determine the total measured value of the weighing hoppers 4 forming the optimal combination as optimal combination weight. The base group including the weighing hoppers 4 forming the optimal combination is determined as the n-th discharge candidate group.

Then, in step S24, it is determined whether or not n is equal to p−1, and if it is determined that n is not equal to p−1, then one is added to n in step 25, and the process from the step S22 is repeated. On the other hand, if it is determined that n is equal to p−1, the process moves to step S26. That is, steps S22 and S23 are repeated until p−1 discharge candidate groups are determined.

In step S26, the combination calculation is performed based on the measured values of the weighing hoppers 4 within the base groups which do not belong to the p−1 discharge candidate groups to select the weighing hoppers 4 forming combination (optimal combination) in which a total measured value with respect to the target weight is in the allowable range and a difference with the target weight is smallest, and to determine the total measured value of the weighing hoppers 4 forming the optimal combination as an optimal combination weight. The base group including the weighing hoppers 4 forming the optimal combination is determined as the p-th discharge candidate group, and thus determined p discharge candidate groups are determined as a discharge group set.

In step S27, with respect to each discharge candidate group in the discharge candidate group set, a difference between the optimal combination weight and the target weight is calculated, and further a total of the differences found with respect to the discharge groups is calculated.

The steps S21 through S27 are repeated (step S20) to thereby find all discharge candidate groups and a total of the differences are found with respect to each discharge candidate group set.

Then, in step S28, one discharge candidate group set whose difference total found in step S27 is smallest is selected from all discharge candidate group sets, and the p discharge candidate groups in that discharge candidate group set are determined as the discharge groups. Through the above mentioned steps S20 through S28, the p discharge groups are determined.

Then, in step S29, the gates of the weighing hoppers 4 forming the optimal combinations in the p discharge groups are opened simultaneously to feed the objects to be weighed to the corresponding collecting hoppers.

Then, in step S30, every time the feed command signal is received from the packaging machine, the gate of the collecting hopper corresponding to each discharge group is opened to discharge the objects to be weighed to the packaging machine. In other words, every time the feed command signal is received from the packaging machine, the objects to be weighed having the optimal combination weight in each discharge group are discharged.

The difference between the optimal combination weight and the target weight with respect to each discharge candidate group found in step S27 will be described. By performing the combination calculation, the weighing hoppers 4 forming a combination in which the total measured value of the weighing hoppers 4 with respect to the target weight is in an allowable range and the difference with the target weight is smallest are selected as the weighing hoppers 4 forming the optimal combination. If the allowable range is more than the target weight, the difference may be obtained by subtracting the target weight from the optimal combination weight. In a case where a value smaller than the target weight is a lower limit value in the allowable range and a value larger than the target weight is an upper limit value in the allowable range, the difference may be obtained by subtracting the target weight from the optimal combination weight as the above mentioned difference if the optimal combination weight is larger than the target weight, and the difference may be obtained by subtracting the optimal combination weight from the target weight if the optimal combination weight is smaller than the target weight. In any case, an absolute value (zero or positive number) of the value obtained by subtracting the target weight from the optimal combination weight may be found as the difference.

A case where the above mentioned process, especially the combination process in steps S20 through 28 are applied to the configuration of FIGS. 1(a) and 1(b) will be described in detail. For example, it is assumed that each of the base groups A to D includes six weighing hoppers 4, the combination group is formed by combining two base groups (k=2), and four weighing hoppers 4 are selected to form the optimal combination, and the number of discharging of the objects to be weighed in one weighing cycle is two (p=2).

First, in step S21 within the repeat step S20, n is initialized to 1.

In step S22, since there is no determined discharge candidate group initially, two base groups selected from all the base groups A to D, for example, the base groups A and B are combined to form one combination group.

In step S23, the combination calculation is performed for the combination group including, for example, the base groups A and B to select four weighing hoppers 4 forming optimal combination and to determine a total measured value of the weighing hoppers 4 forming that optimal combination weight as optimal combination weight. And, the base group including the weighing hoppers 4 forming the optimal combination is determined as a first discharge candidate group. In this example, since four weighing hoppers 4 are selected to form the optimal combination and six weighing hoppers 4 are provided in each base group, the weighing hoppers 4 forming the optimal combination may belong to both or one of the base groups A and B. If the weighing hoppers 4 forming the optimal combination belong to both of the base groups A and B, then the base groups A and B are the discharge candidate groups. If the weighing hoppers 4 belong only to the base group A, then only the base group A is the discharge candidate group, whereas if the weighing hoppers 4 belong only to the base group B, then only the base group B is the discharge candidate group.

Then, in step S24, it is determined whether or not n is equal to p−1. In this example, n=1, p=2, and p−1=1. Since it is determined that n is equal to p−1, the process moves to step 26.

If the base groups A and B have been determined as the discharge candidate group in step S23, in step S26, the combination calculation is performed based on the measured values of the weighing hoppers 4 within the base groups C and D which do not belong to the discharge candidate group to select four weighing hoppers 4 forming optimal combination and to determine a total measured value of the weighing hoppers 4 forming that optimal combination as optimal combination weight. Then, the base group including the weighing hoppers 4 forming that optimal combination is determined as a second discharge candidate group and thus determined two discharge candidate groups are determined as the discharge candidate group set. If the base group A has been determined as the discharge candidate group in step S23, then the combination calculation is performed based on the measured values of the weighing hoppers 4 in the three base groups B, C, and D which do not belong to the discharge candidate group to select four weighing hoppers 4 forming optimal combination and to determine a total measured value of the weighing hoppers 4 forming that optimal combination as optimal combination weight. And, the base group including the weighing hoppers 4 forming optimal combination is determined as the second discharge candidate group, and thus determined two discharge candidate groups are determined as a discharge candidate group set.

In step S27, with respect to each of the two discharge candidate groups in the discharge candidate group set, the difference between the optimal combination weight and the target weight is calculated and, further, a total of the differences found with respect to the respective discharge candidate groups are calculated.

Furthermore, steps S21 through S27 of the repeat step S20 are repeated. For example, the above mentioned process is repeated in step S22 with respect to a case where the base groups A and C are the combination group, and further with respect to a case where the base groups A and D are the combination group. In the same manner, the process is repeated with respect to cases where the base groups B and C, the base groups B and D, and the base groups C and D are combination groups, respectively. Thereby, all discharge candidate group sets are found and the total of the differences with respect to each discharge group set is found.

Then, in step S28, one candidate discharge candidate group set whose difference total found in step S27 is selected from all discharge candidate group sets, and the two discharge candidate groups in that discharge candidate group set are determined as the discharge groups.

Subsequently, the combination process in step S20 to S28 in a case where there are seven base groups (seven collecting chutes and seven collecting hoppers) will be described. Here it is assumed that each of the seven base groups A to G includes four weighing hoppers 4, the combination group is formed by combining two base groups (k=2), four weighing hoppers 4 are selected as the weighing hoppers 4 forming optimal combination, and the number of discharging of the objects to be weighed in one weighing cycle is three (p=3).

First of all, in step S21 of the first repeat step S20, n is initialized to 1.

In step S22, since there is no determined discharge candidate group initially, two base groups selected from all the base groups A to G, for example, the base groups A and B are combined to form one combination group.

In step S23, the combination calculation is performed for the combination group including, for example, the base groups A and B to select four weighing hoppers 4 forming the optimal combination and to determine the total measured value of the weighing hoppers 4 forming that optimal combination weight as the optimal combination weight. And, the base group including the weighing hoppers 4 forming the optimal combination is determined as a first discharge candidate group. In this example, since four weighing hoppers 4 are provided in each base group, the four weighing hoppers 4 selected to form the optimal combination may belong to both or one of the base groups A and B forming the combination group.

Then, in step S24, it is determined whether or not the n is equal to p−1. In this example, initially, n=1, p=3, and p−1=2. Since it is determined that n is not equal to p−1, n=2 is set in step S25 and then the process return to step S22.

If the base groups A and B have been determined as the discharge candidate group in step S23, in step S22, one of 10 (=5C2) combination groups including two base groups selected from five base groups C to G, excluding the base groups A and B is determined as the combination group. Also, if only one base group (e.g., base group A) has been determined as the discharge candidate group, then one combination group is selected from 15 (=6C2) combination groups including two base groups selected from six base groups B to G, excluding the base group A.

Following this, step S23 is performed in the same manner as described above to determine a second (n=2) discharge candidate group. Then in step S24, n=2, p=3, and p−1=2. Since it is determined that n is equal to p−1, the process moves to step S26.

If the base group A has been determined as the first discharge candidate group and the base groups B and C are determined as the second discharge candidate groups, in step S26, the combination calculation is performed based on the measured values of the weighing hoppers 4 within the base groups D to G which do not belong to the discharge candidate groups to select the weighing hoppers 4 forming optimal combination and to determine a total measured value of the weighing hoppers 4 forming that optimal combination as optimal combination weight. And, the base groups including the weighing hoppers 4 forming the optimal combination is determined as the third discharge candidate group, and thus determined three discharge candidate groups are determined as a discharge candidate group set.

In step S27, with respect to each of the three discharge candidate groups in the discharge group set, a difference between the optimal combination weight and the target weight is calculated, and further a total of the differences found with respect to the discharge candidate groups is calculated.

Further, the steps S21 through S27 of the repeat step S20 are repeated. In this example, in step S21 of the second repeat step S20, n=1 is set, in step S22, the base groups A and B identical to those of the first repeat step S20 are determined as the combination group, and steps S23, S24, and 25 are performed. Thereafter, in step S22 in the case of n=2, a combination group different from the combination group found in the first repeat step S20 (n=2) is found. For example, when the discharge candidate group found in step S23 is identical to the combination group, in the first repeat step S20, the base groups A and B are determined as the combination group in step S22 in the case of n=1 and the base groups C and D are determined as the combination group in step S22 in the case of n=2. And, in the second repeat step S20, the base groups A and B are determined as the combination group in step S22 in the case of n=1 and the base groups C and E are determined as the combination group in step S22 in the case of n=2. And, in the third repeat step S20, the base groups A and B are determined as the combination group in step S22 in the case of n=1 and the base groups C and F are determined as the combination group in step S22 in the case of n=2. And, in the fourth repeat step S20, the base groups A and B are determined as the combination group in step S22 in the case of n=1 and the base groups C and G are determined as the combination group in step S22 in the case of n=2. Then, in the fifth to eighth repeat steps S20, the base groups A and C (fifth to eight repeat steps S20) are determined as the combination group found in step S22 in the case of n=1, and the base groups B and D (fifth step S20), the base groups B and E (sixth step S20), the base groups B and F (seventh step S20) and the base groups B and G (eighth step S20) are determined as the combination group in step S22 in the case of n=2. In this manner, by repeating the repeat step S20, all discharge candidate group sets are found, and in addition, the total of the differences is found with respect to each discharge candidate group set.

Then, in step S28, one discharge candidate group set whose total difference found in step S27 is smallest is selected from all discharge candidate group sets, and the three discharge candidate groups in that discharge candidate group set are determined as the discharge groups.

Subsequently, a combination process in step S20 to S28 in a case where there are three base groups (three collecting chutes and three collecting hoppers) will be described. Here it is assumed that each of three base groups A to C includes eight weighing hoppers 4, four weighing hoppers 4 are selected as the weighing hoppers 4 forming the optimal combination, and the number of discharging of the objects to be weighed in one weighing cycle is twice (p=2). When the number of base groups is four or more, it is desirable to combine plural base groups to form a combination group. However, when the number of base groups is three as in this example, each combination group includes one base group (k=1). In other words, the combination group is identical to the base group.

First of all, in step S21 of the repeat step S20, n is initialized to 1.

In step S22, since there is no determined discharge candidate group initially, one of the base groups A, B, and C is the combination group.

In step S23, the combination calculation is performed for the combination group found in step S22 to select the weighing hoppers 4 forming the optimal combination and to determine the total measured value of the weighing hoppers 4 forming optimal combination as optimal combination weight. And, the base group (here, base group is identical to the combination group) including the weighing hoppers 4 forming the optimal combination is determined as a first discharge candidate group.

Then, in step S24, it is determined whether or not the n is equal to p−1. In this example, n=1, p=2, and p−1=1. Since it is determined that n is equal to p−1, the process moves to step S26.

If the base group A has been selected as the combination group in step S22 and the base group A has been determined as the discharge candidate group in step S23, then, in step S26, the combination calculation is performed based on the measured values of the weighing hoppers 4 within the base groups B and C which do not belong to the discharge candidate group to select four weighing hoppers 4 forming optimal combination and to determine a total measured value of the weighing hoppers 4 forming that optimal combination as optimal combination weight. Then, the base group including the weighing hoppers 4 forming that optimal combination is determined as a second discharge candidate group and thus determined two discharge candidate groups are determined as a discharge candidate group set.

In step S27, with respect to each of the two discharge candidate groups in the discharge candidate group set, a difference between the optimal combination weight and the target weight is calculated, and further, a total of the differences found with respect to the respective discharge candidate groups is calculated.

Furthermore, the process of the steps S21 to S27 of the repeat step S20 are repeated. For example, subsequently, the process is repeated with respect to a case where the base group B is selected as the combination group in step S22, and further, the process is repeated with respect to a case where the base group C is selected as the combination group in step S22. Through these processes, all discharge candidate group sets are found and the total of the differences is found with respect to each discharge candidate group set.

Then, in step 28, one discharge candidate group set whose difference total found in step S27 is smallest is selected from all discharge candidate group sets, and two discharge candidate groups in that discharge candidate group set are determined as the discharge group.

Whereas in the above mentioned process in FIG. 6, the base group including the weighing hoppers 4 forming the optimal combination in the combination group is determined as the discharge candidate group, the combination group may alternatively be directly determined as the discharge candidate group (in this case, combination precision may be slightly reduced). Also, whereas the combination calculation is performed based on the measured values of the weighing hoppers 4 within the base groups which do not belong to p−1 discharge candidate groups to determine the base group including the weighing hoppers 4 forming the optimal combination as p-th discharge candidate group in step S26, base groups which do not belong to the p−1 discharge candidate groups may alternatively be determined as the p-th discharge candidate group (Note that the combination calculation is also performed in this case). In these cases, in step S30, in the respective discharge groups for sequentially discharging the objects to be weighed, only the collecting hoppers corresponding to the base groups including the weighing hoppers 4 forming the optimal combination within those discharge groups may be opened and closed to discharge the objects to be weighed.

Whereas step S27 is performed within the repeat step S20, the difference between the optimal combination weight and the target weight for the respective discharge candidate groups may be found and the total of the differences may be found with respect to each of all the discharge candidate group sets extracted in the repeat step S20 before step S28 is performed after the repeat step S20 (repeating of steps S21 to S26) is completed, instead of performing step S27 within the repeat step S20.

Also, when the step S22 is repeated within one loop in which the repeat step S20 is repeated, the number k of the base groups forming the combination group may be changed. For example, the number of base groups forming the combination groups may be set larger in second step S2 than in first step S2.

In this embodiment, also, the timing chart of the operation of the combination weigher in the case where the two discharge groups are determined by the combination process is illustrated in FIG. 4, and the timing chart of the operation of the combination weigher in the case where the three discharge groups are determined by the combination process is illustrated in FIG. 5. The first, second, and (third) discharge groups illustrated in FIG. 4 (FIG. 5) are the discharge groups comprising the first, second, and (third) discharge candidate groups in the discharge candidate group set selected in step S28 in the combination process. Alternatively, numbers (1, 2, 3, . . . ) indicating discharge priority may be assigned to all base groups (or collecting hoppers), and smallest numbers of the base groups belonging to the discharge groups determined in step S28 may be compared to each other, and the discharge group including the base group with smallest number, the discharge group including the base group with the second smallest number, and the discharge group including the base group with the third smallest number in the case of FIG. 5 may be determined as the first, second, and third discharge groups, respectively.

In this embodiment, as in the first embodiment, as shown in FIGS. 4 and 5, the discharge can be performed twice or three times faster than in a case where the entire apparatus operates as a single combination weigher, thereby allowing the combination weigher to be adapted to a packaging machine operated at a high speed. Moreover, the objects to be weighed discharged from the weighing hoppers 4 are fed into the corresponding collecting hoppers through the corresponding collecting chutes to be temporarily accumulated therein and are discharged from the collecting hoppers in a state of gathering together satisfactorily. Therefore, each discharge time of the objects to be weighed discharged from the collecting hopper corresponding to each discharge group can be shortened and the objects to be weighed can be also prevented from being stuck inside the packaging machine.

In the combination process of this embodiment, the total weight of the objects to be weighed which are discharged from the p discharge groups can be reduced and thus consumption amount of the objects to be weighed can be reduced as compared to the first embodiment.

In this embodiment, the number of collecting chutes and the collecting hoppers, i.e., the number of base groups is required to be set to three or more, and is desirably set to four or more. This is because when the number is four or more, the combination group in the combination process can be formed by combining plural base groups, and more combinations can be created for the combination calculation in step S23 when the number of the weighing hoppers in the base groups is equal.

Figure 7:
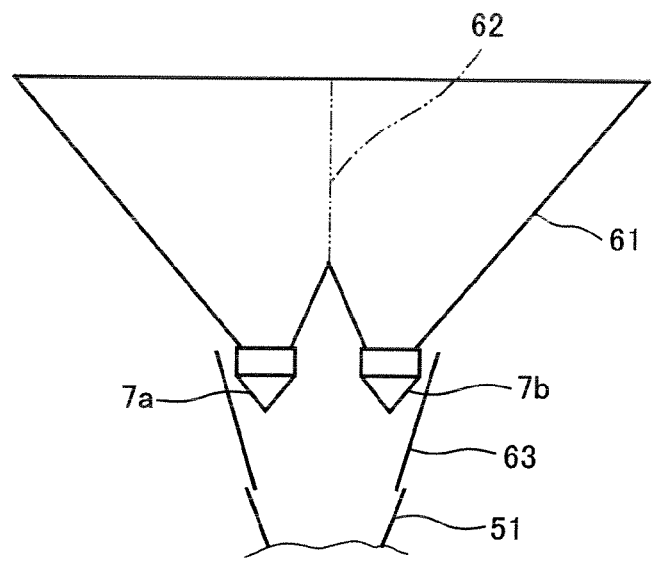
FIG. 7(a) is a schematic diagram of another example of collecting chutes and collecting hoppers in the combination weigher according to the embodiment of the present invention as seen from laterally.
FIG. 7(b) is a schematic diagram of the collecting chutes and collecting hoppers of another example seen from above.
Figure 7B:
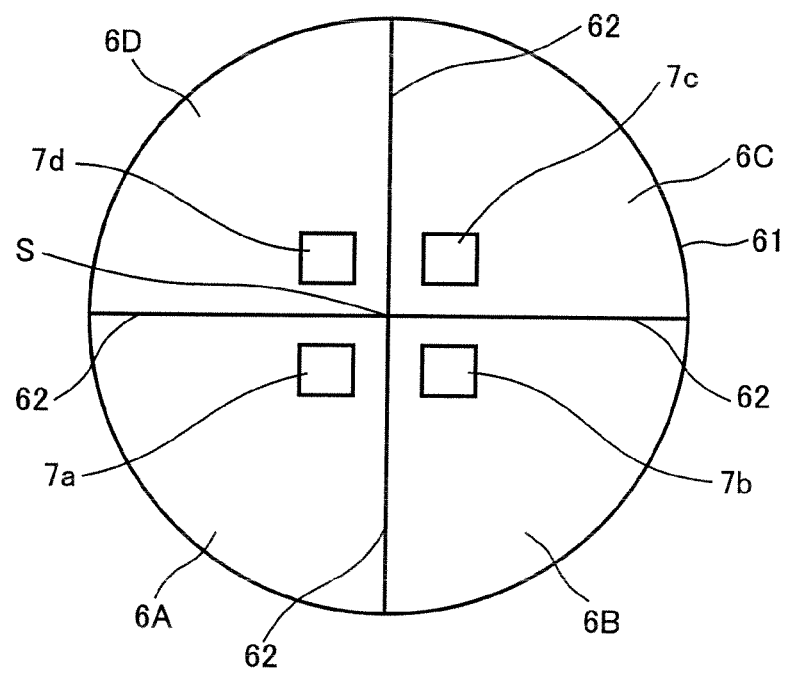

In the first and second embodiments, the collecting chutes and the collecting hoppers shown in FIGS. 1(a) and 1(b) may be replaced by collecting chutes and collecting hoppers shown in FIGS. 7(a) and 7(b). FIG. 7(a) is a schematic view showing the collecting chutes and the collecting hoppers which replace the collecting chutes and the collecting hoppers shown in FIGS. 1(a) and 1(b) as seen from laterally, and FIG. 7(b) is a schematic view of the collecting chutes and the collecting hoppers shown in FIG. 7(a) as viewed from above. Whereas the four collecting hoppers 7A to 7D are provided integrally at a lower part of a center of the chute 61 of the substantially inverted conical shape as shown in FIGS. 1(a) and 1(b), outlets of the collecting chutes 6A to 6D are provided at the lower part in the vicinity of the center of the chute 61 of substantially inverted conical shape to be spaced apart from each other, collecting hoppers 7a to 7d are respectively provided at the outlets, and a lower chute 63 of an inverted frustconical shape is provided to receive the objects to be weighed which are discharged from the collecting hoppers 7a to 7d and to feed them to the tube 51 of the packaging machine. The gates of the four collecting hoppers 7a to 7d may be constituted as in those of the known feeding hoppers 3 and the like. The lower chute 63 may be omitted so long as the objects to be weighed which are discharged from the collecting hoppers 7a to 7d can be directly fed into the tube 51 of the packaging machine. In a further alternative, a substantially inverted conical region of the side surface of the chute 61 may be integral with the lower chute 63, and the collecting hopper may be provided at an intermediate position of the chute integrally formed. As described above, the number of collecting chutes and the collecting hoppers, i.e., the number of base groups is required to be three or more.

The collecting chutes 6A to 6D may be separated. To be specific, the collecting chutes may be separated to respectively correspond to the base groups, the collecting hoppers (7a to 7d) may be provided at lower parts of the collecting chutes, and the lower chute (63) may be provided to receive the objects to be weighed which are discharged from all the collecting hoppers and to discharge them to the tube (51) of the packaging machine.

Whereas in the first and second embodiments, the number of the weighing hoppers 4 which are included in each base group and participate in the combination is set to equal, it is not necessarily set to equal. For example, eleven weighing hoppers 4 in total are equipped, and five base groups each including two weighing hoppers 4 and one base group including one weighing hopper 4 may be created.

Figure 8:
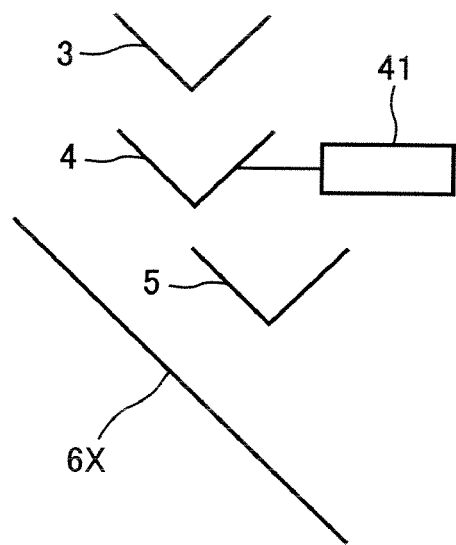
FIG. 8 is a schematic diagram showing another example of hoppers for use in the combination weigher according to the embodiment of the present invention.

Whereas in the first and second embodiments, only the weighing hoppers 4 are illustrated as hoppers which participate in the combination, a memory hopper 5 may be provided obliquely below each weighing hopper 4 as shown in FIG. 8 to participate in the combination. In this case, each weighing hopper 4 is capable of selectively discharging the objects to be weighed to the collecting chute 6X (6A to 6D) or the memory hopper 5. When the memory hopper 5 becomes empty, the weighing hopper 4 feeds the objects into it. The control unit 21 performs the combination process to determine discharge groups and select combination of hoppers which have optimal combination weight from a plurality of weighing hoppers 4 and memory hoppers 5 in the respective discharge groups, so that hoppers forming that combination discharge the objects to be weighed onto the collecting chute 6X. The weight of the objects to be weighed that has been measured in the weighing hopper 4 located above the memory hopper 5 is used as the weight of the objects to be weighed inside the memory hopper 5 used in the combination calculation.

For example, in the construction of FIGS. 1(a) and 1(b), three weighing hoppers 4 and three memory hoppers 5 are needed in each of the base groups A to D to achieve performance substantially equivalent to that of a combination weigher equipped with, for example, six weighing hoppers 4 in each of the base groups A to D. This makes it possible to decrease the weight sensors 41 which are expensive to half in number.

Figure 9:
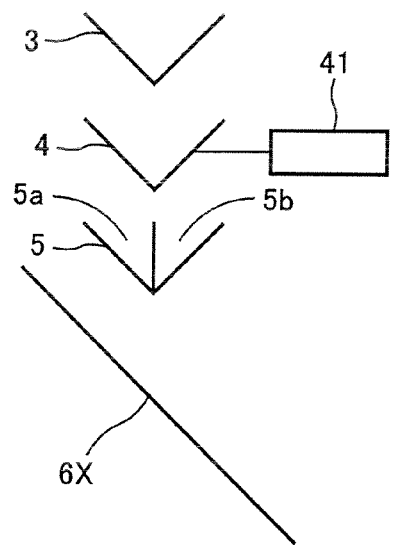
FIG. 9 is a schematic diagram showing another example of hoppers for use in the combination weigher of the embodiment of the present invention.

Furthermore, as shown in FIG. 9, each memory hopper 5 may be configured to include two accommodating chambers 5a and 5b. In this case, each weighing hopper 4 is capable of selectively discharging the objects to be weighed to the accommodating chamber 5a or the accommodating chamber 5b, and does not discharge the objects to be weighed onto the collecting chute 6X. The two accommodating chambers 5a and 5b of each memory hopper 5 are capable of independently discharging the objects to be weighed. The combination calculation is performed based on the weights of the objects to be weighed inside the accommodating chambers 5a and 5b of each memory hopper 5, and the accommodating chambers 5a and 5b participate in the combination, but the weighing hoppers 4 do not participate in the combination. The weight of the objects to be weighed that has been measured in the weighing hopper 4 located above the accommodating chambers 5a and 5b is used as the weights of the objects to be weighed inside the accommodating chambers 5a and 5b. The weighing hopper 4 may participate in the combination provided that each weighing hopper 4 and the accommodating chamber 5a or 5b of the corresponding memory hopper 5 are simultaneously selected. For example, when the weighing hopper 4 and the accommodating chamber 5a of the memory hopper 5 are simultaneously selected, the objects to be weighed are discharged from the weighing hopper 4 onto the collecting chute 6X through the accommodating chamber 5a.

Figure 10:
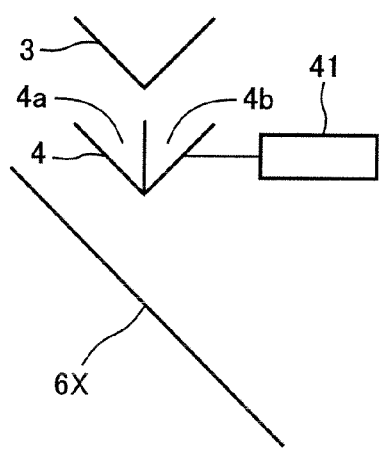
FIG. 10 is a schematic diagram showing another example of hoppers for use in the combination weigher of the embodiment of the present invention.

Moreover, as shown in FIG. 10, each weighing hopper 4 may be configured to have two weighing chambers 4 and 4b. In this case, the feeding hopper 3 is capable of selectively discharging the objects to be weighed to the weighing chamber 4a or the weighing chamber 4b, and the two weighing chambers 4a and 4b of the weighing hopper 4 are capable of independently discharging the objects to be weighed. The combination calculation is performed based on the weights of the objects to be weighed inside the weighing chambers 4a and 4b of each weighing hopper 4 and the weighing chambers 4a and 4b participate in the combination. In each weighing hopper 4 having the two weighing chambers 4a and 4b, when the objects to be weighed are fed only to one of the weighing chambers, for example, the weighing chamber 4a, the weight sensor 41 measures a weight of the objects to be weighed inside the weighing chamber 4a. When the objects to be weighed are fed to the other weighing chamber 4b, the weight sensor 41 measures a total weight of the objects to be weighed inside the two weighing chambers 4a and 4b. The control unit 21 (see FIG. 1) calculates the weight of the objects to be weighed inside the weighing chamber 4b by subtracting the weight of the objects to be weighed inside the weighing chamber 4a from the total weight of the objects to be weighed inside the two weighing chambers 4a and 4b, and performs combination calculation.

Figure 11:
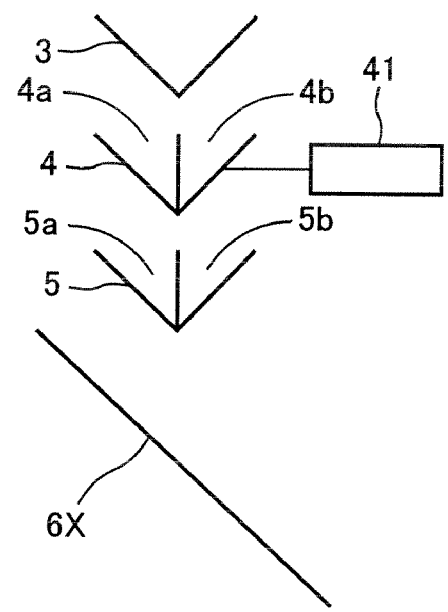
FIG. 11 is a schematic diagram showing another example of hoppers for use in the combination weigher according to the embodiment of the present invention.

Moreover, as shown in FIG. 11, each weighing hopper 4 may be configured to have two weighing chambers 4a and 4b, and the memory hopper 5 having two accommodating chambers 5a and 5b corresponding to the weighing chambers 4a and 4b of the weighing hopper 4 may be provided below each weighing hopper 4. In this case, each feeding hopper 3 is capable of selectively discharging the objects to be weighed to the weighing chamber 4a or the weighing chamber 4b of the weighing hopper 4. The objects to be weighed in the weighing chamber 4a of the weighing hopper 4 are fed into the accommodating chamber 5a of the memory hopper 5 and the objects to be weighed in the weighing chamber 4b of the weighing hopper 4 are fed into the accommodating chamber 5b of the memory hopper 5. The combination calculation is performed based on the weights of the objects to be weighed inside the accommodating chambers 5a and 5b of each memory hopper 5, the accommodating chambers 5a and 5b participate in the combination, and the weighing hopper 4 does not participate in the combination. The weights of the objects to be weighed that have been measured and calculated in the weighing chambers 4a and 4b of the weighing hopper 4 located above the accommodating chambers 5a and 5b are used as the weights of the objects to be weighed inside the accommodating chambers 5a and b. The weighing chambers 4a and 4b of the weighing hopper 4 may participate in the combination provided that the weighing chambers 4a and 4b and the corresponding accommodating chamber 5a and 5b are simultaneously selected. For example, when the weighing chamber 4a and the corresponding accommodating chamber 5a are simultaneously selected, the objects to be weighed are discharged from the weighing chamber 4a onto the collecting chute 6X through the accommodating chamber 5a.

The dispersion feeder 1, the linear feeders 2, and the feeding hoppers 3 in the combination weighers of the first and second embodiments are not intended to be limited in construction to the above. They may be constructed in other ways depending on the type of the objects to be weighed such as powder or chunks so long as means for feeding the objects to be weighed to the weighing hopper 4 is equipped. Furthermore, the control unit 21 is not limited to being configured as the single control apparatus, but instead may be configured to include a plurality of control apparatuses disposed in a distributed manner, and these control apparatuses may co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The combination weigher of the present invention is useful as a combination weigher capable of being adapted to a packaging machine operated at a high speed.

The invention claimed is:

1. A combination weigher comprising:
   a plurality of base groups including a plurality of circular-arc-shaped hopper lines into which a combination hopper line including a plurality of combination hoppers which are circularly arranged and fed with objects to be weighed are divided;
   a plurality of collecting chutes which are respectively disposed below the base groups to respectively correspond to the base groups and have outlets at lower parts thereof, each of the collecting chutes collecting the objects to be weighed discharged from the combination hopper in the corresponding base group and discharging the objects to be weighed from the outlet;
   a plurality of collecting hoppers respectively provided at the outlets of the collecting chutes to respectively correspond to the base groups and the collecting chutes, the collecting hoppers temporarily accumulating the objects to be weighed discharged from the outlets of the collecting chutes and thereafter discharging the objects to be weighed; and
   a control means;
   wherein the control means is configured to perform:
   a combination process to determine p discharge groups, wherein p is a plural number and is less than the number of all base groups, each discharge group including a plurality of base groups, the combination process also to perform combination calculation based on weights of the objects to be weighed which have been fed into the combination hoppers in the discharge groups to select combination hoppers forming combination in which total weight of the objects to be weighed with respect to a target weight is in an allowable range and a difference with respect to the target weight is smallest;
   an internal discharge process to cause the combination hoppers forming all combinations selected in the discharge groups to discharge the objects to be weighed simultaneously; and
   an external discharge process to sequentially select the discharge groups and to cause the collecting hoppers corresponding to the base groups including the combination hoppers forming combinations in the discharge groups to discharge the objects to be weighed, according to the selected sequence.

2. The combination weigher according to claim 1, wherein the combination process includes:
   a process to determine p minus 1 discharge groups by performing, p minus 1 times, a series of processes including a first process to find all combination groups each including a combination of k base groups, wherein k is an integer of one or more, which base groups do not belong to the discharge groups; a second process to perform, with respect to each of the combination groups, combination calculation based on the weights of the objects to be weighed which have been fed into the combination hoppers within the combination groups to find combination hoppers forming first combination in which a total weight of the objects to be weighed with respect to the target weight is in the allowable range and a difference with respect to the target weight is smallest and to determine total weight of the objects to be weighed in the combination hoppers forming the first combination as optimal combination weight of the combination group; and a third process to select the combination group whose optimal combination weight has a smallest difference with respect to the target weight from all combination groups and to determine the selected combination group or the base group including the combination hoppers forming the first combination within the selected combination group as the discharge group; and
   a process to perform combination calculation based on the weights of the objects to be weighed which have been fed into the combination hoppers in base groups which do not belong to the p minus 1 discharge groups to find combination hoppers forming a second combination in which a total weight of the objects to be weighed with respect to the target weight is in the allowable range and a difference with respect to the target weight is smallest and to determine the base groups which do not belong to the p minus 1 discharge groups or the base group including the combination hoppers forming the second combination as p-th discharge group.

3. The combination weigher according to claim 1, wherein the combination process includes:
   a process to find all discharge candidate group sets in which at least one discharge candidate group belonging to one discharge candidate group set is different from that belonging to another discharge candidate group set and to calculate a total of differences in each of the discharge candidate group sets, by repeating, plural times, a loop process including a first combination process to determine p minus 1 discharge candidate groups each including one or more base groups and to find optimal combination weight in each of the discharge candidate groups; a second combination process to determine p-th discharge candidate group including one or more base groups and to find optimal combination weight of the p-th discharge candidate group and add the p-th discharge candidate group and the p minus 1 discharge candidate groups to form one discharge candidate group set; and a calculation process to calculate a total of differences between the optimal combination weights and the target weight with respect to the p discharge candidate groups in the discharge candidate group set; and a process to determine, as the discharge groups, the p discharge candidate groups in the discharge candidate group set in which the total of differences is smallest, which are selected from the discharge candidate group sets;

the first combination process in a loop process with the same ordinal number, in the loop process repeated plural times, is a process to determine the p minus 1 discharge candidate groups by repeating, p minus 1 times, a series of processes including a first process to find arbitrary combination group including a combination of k base groups, wherein k is an integer of one or more, which base groups do not belong to the discharge candidate groups by a second process; a second process to perform combination calculation with respect to the combination group based on the weights of the objects to be weighed which have been fed into the combination hoppers within the combination groups to select combination hoppers forming first combination in which a total weight of the objects to be weighed with respect to the target weight is in the allowable range and a difference with respect to the target weight is smallest and to determine the combination group or the base groups including the combination hoppers forming the first combination within the combination group as one discharge candidate group and the total weight of the objects to be weighed in the combination hoppers forming the first combination as optimal combination weight of the discharge candidate group, the second combination process in the loop process with the same ordinal number, is a process to perform combination calculation based on the weights of the objects to be weighed which have been fed into the combination hoppers within base groups which do not belong to the p minus 1 discharge candidate groups to select combination hoppers forming second combination in which a total weight of the objects to be weighed with respect to the target weight is in the allowable range and a difference with respect to the target weight is smallest and to determine the base groups which do not belong to the p minus 1 discharge candidate groups or the base groups including the combination hoppers forming the second combination as the p-th discharge candidate group and the total weight of the objects to be weighed in the combination hoppers forming the second combination an optimal combination weight of the p-th discharge candidate group; and to add the p-th discharge candidate group and p minus 1 discharge candidate groups to form one discharge candidate group set.

4. The combination weigher according to claim 2, wherein in the process to determine the p minus 1 discharge groups by performing the series of processes including the first, second, and third processes p minus 1 times, the number k of the base groups forming the combination group is changed at least once.

5. The combination weigher according to claim 3, wherein in the first combination process to determine the p minus 1 discharge candidate groups by performing the series of processes including the first and second processes p minus 1 times, the number k of the base groups forming the combination group is changed at least once.

6. The combination weigher according to claim 1, wherein the number of the discharge groups is set to two or three.

7. The combination weigher according to claim 1, wherein the combination hoppers included in the base groups are set to be equal in number.

8. The combination weigher according to claim 1, wherein the combination hoppers included in at least one base group of all base groups are different in number from the combination hoppers included in another base group.

9. The combination weigher according to claim 1, wherein the combination hoppers are weighing hoppers which weigh weights of the objects to be weighed fed into the weighing hoppers.

10. The combination weigher according to claim 1, wherein the combination hopper line includes upper and lower combination hopper lines;

and wherein the combination hoppers on the upper combination hopper line are weighing hoppers which weigh weights of the objects to be weighed fed into the weighing hoppers; the combination hoppers on the lower combination hopper line are memory hoppers which are provided to respectively correspond to the weighing hoppers and are fed with the objects to be weighed which have been weighed by the weighing hoppers, and the weighing hoppers are each capable of selectively discharging the objects to be weighed to the corresponding memory hopper or the corresponding collecting chute.

11. The combination weigher according to a-claim 1, further comprising:

a plurality of weighing hoppers disposed above the combination hoppers to respectively correspond to the combination hoppers, for weighing weights of the objects to be weighed fed into the weighing hoppers;

wherein the combination hoppers are memory hoppers each including two accommodating chambers into which the objects to be weighed which have been weighed by the weighing hopper are fed, the accommodating chambers being capable of independently discharging the objects to be weighed;

wherein the weighing hoppers are each capable of selectively discharging the objects to be weighed to one of the two accommodating chambers of the corresponding memory hopper; and wherein the control means is configured to perform combination calculation in the combination process based on weights of the objects to be weighed which have been fed into the accommodating chambers of the memory hoppers to determine combination of the accommodating chambers of the memory hoppers, and to cause the accommodating chambers forming the determined combination to discharge the objects to be weighed in the internal discharge process and to cause the collecting hopper corresponding to the base groups including the memory hoppers having the accommodating chambers forming the determined combination to discharge the objects to be weighed in the external discharge process.

12. The combination weigher according to claim 1, wherein the combination hoppers are weighing hoppers each of which includes two weighing chambers and weighs weights of the objects to be weighed which have been fed into the weighing chambers, the weighing chambers being independently discharging the objects to be weighed; and wherein the control means is configured to perform combination calculation in the combination process based on the weights of the objects to be weighed which have been fed into the weighing chambers of each weighing hopper to determine combination of the weighing chambers of the weighing hopper and to cause the weighing chambers forming the determined combination to discharge the objects to be weighed in the internal discharge process and to cause the collecting hopper corresponding to the base groups including the weighing hoppers having the weighing chambers forming the determined combination to discharge the objects to be weighed in the external discharge process.

13. The combination weigher according to claim 1, further comprising:

a plurality of weighing hoppers disposed above the combination hoppers to respectively correspond to the combination hoppers, each of which includes two weighing chambers and weighs weights of the objects to be weighed which have been fed into the weighing chambers, the weighing chambers being independently discharging the objects to be weighed; and wherein the combination hoppers are memory hoppers each including two accommodating chambers corresponding to the weighing chambers of the corresponding weighing hopper, the objects to be weighed which have been fed from the corresponding weighing chambers being fed into the accommodating chambers, the accommodating chambers being capable of independently discharging the objects to be weighed;

wherein the control means is configured to perform combination calculation in the combination process based on weights of the objects to be weighed which have been fed into the accommodating chambers of the memory hoppers to determine combination of the accommodating chambers of the memory hoppers, and to cause the accommodating chambers forming the determined combination to discharge the objects to be weighed in the internal discharge process and to cause the collecting hopper corresponding to the base groups including the memory hoppers having the accommodating chambers forming the determined combination to discharge the objects to be weighed in the external discharge process.

* * * * *

UNITED STATES PATENT AND TRADEMARK OFFICE
CERTIFICATE OF CORRECTION

PATENT NO. : 8,035,041 B2
APPLICATION NO. : 11/719725
DATED : October 11, 2011
INVENTOR(S) : Hiroshi Higuchi et al.

It is certified that error appears in the above-identified patent and that said Letters Patent is hereby corrected as shown below:

On the Title Page
Item (75) Inventors:

Line 2 Delete "Kawanishi, Nishinomiya (JP)" and replace with -- Kawanishi, Nishinomiya-shi (JP) --.

Signed and Sealed this
Twenty-seventh Day of May, 2014

Michelle K. Lee
*Deputy Director of the United States Patent and Trademark Office*